United States Patent
Togami et al.

(10) Patent No.: US 9,288,576 B2
(45) Date of Patent: Mar. 15, 2016

(54) DEREVERBERATION PARAMETER ESTIMATION DEVICE AND METHOD, DEREVERBERATION/ECHO-CANCELLATION PARAMETER ESTIMATION DEVICE, DEREVERBERATION DEVICE, DEREVERBERATION/ECHO-CANCELLATION DEVICE, AND DEREVERBERATION DEVICE ONLINE CONFERENCING SYSTEM

(71) Applicant: Hitachi, Ltd., Chiyoda-ku, Tokyo (JP)

(72) Inventors: Masahito Togami, Tokyo (JP); Yohei Kawaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 50 days.

(21) Appl. No.: 14/379,144

(22) PCT Filed: Feb. 15, 2013

(86) PCT No.: PCT/JP2013/053645
§ 371 (c)(1),
(2) Date: Aug. 15, 2014

(87) PCT Pub. No.: WO2013/122183
PCT Pub. Date: Aug. 22, 2013

(65) Prior Publication Data
US 2015/0016622 A1     Jan. 15, 2015

(30) Foreign Application Priority Data
Feb. 17, 2012    (JP) .................................. 2012-033159

(51) Int. Cl.
*H04B 3/20*      (2006.01)
*H04R 3/00*      (2006.01)
(Continued)

(52) U.S. Cl.
CPC ............ *H04R 3/002* (2013.01); *G10K 11/1784* (2013.01); *G10K 11/1788* (2013.01);
(Continued)

(58) Field of Classification Search
None
See application file for complete search history.

(56) References Cited

U.S. PATENT DOCUMENTS 6,044,068 A *   3/2000   El Malki ................ H04B 3/234
                                                            370/286
7,215,765 B2 *   5/2007   Dyba ....................... H04B 3/23
                                                    379/406.06

(Continued)

FOREIGN PATENT DOCUMENTS

JP       62-130029 A     6/1987
JP       63-19924 A      1/1988
(Continued)

OTHER PUBLICATIONS

International Search Report (PCT/ISA/210) dated Mar. 12, 2013 with English translation (three pages).
(Continued)

*Primary Examiner* — Muhammad N Edun
(74) *Attorney, Agent, or Firm* — Crowell & Moring LLP

(57) ABSTRACT

In a conventional dereverberation system, when there is a fluctuating reverberation component, it has been difficult to determine, with high accuracy, a linear dereverberation filter for removing a non-fluctuating reverberation component. An algorithm integrating a dereverberation system using a linear filter and a dereverberation system using a non-linear filter includes the function of measuring the amount of fluctuation in transfer function in a latter-stage non-linear filter over time, and controls the strength of the non-linear filter over time based on the function. In this configuration, a strong non-linear process is implemented only when the fluctuation in transfer function is large, whereby distortion in speech components can be minimized. Further, by feeding the amount of fluctuation in transfer function over time by the function back to the estimation of a previous-stage linear filter, and thus reducing the weight for a time band in which the transfer function of a linear filter estimated value fluctuates, the influence causing a decrease in estimation accuracy of the transfer function can be reduced.

12 Claims, 21 Drawing Sheets

(51) Int. Cl.
  *H04B 3/23* (2006.01)
  *G10K 11/178* (2006.01)
  *H04R 3/02* (2006.01)
  *H04M 9/08* (2006.01)
  *G10L 21/0208* (2013.01)

(52) U.S. Cl.
  CPC .............. *G10L21/0208* (2013.01); *H04B 3/23* (2013.01); *H04M 9/082* (2013.01); *H04R 3/02* (2013.01); *G10L 2021/02082* (2013.01); *H04R 3/005* (2013.01); *H04R 2430/03* (2013.01)

(56) References Cited

U.S. PATENT DOCUMENTS

| | | | |
|---|---|---|---|
| 7,539,300 B1 * | 5/2009 | Benyassine | H04B 3/234 379/406.04 |
| 7,590,526 B2 * | 9/2009 | Fukuda | 704/211 |
| 2008/0059157 A1 | 3/2008 | Fukuda et al. | |

FOREIGN PATENT DOCUMENTS

| | | |
|---|---|---|
| JP | 2006-157498 A | 6/2006 |
| JP | 4107613 B2 | 6/2008 |

OTHER PUBLICATIONS

Japanese-language Written Opinion (PCT/ISA/237) dated Mar. 12, 2013 (three pages).

Yoshioka et al. "Blind Separation and Dereverberation of Speech Mixtures by Joint Optimization" Jan. 2011, pp. 69-84, vol. 19, Issue 1, IEEE Transactions on Audio, Speech, and Language Processing.

Kinoshita et al. "Suppression of Late Reverberation Effect on Speech Signal Using Long-Term Multiple-step Linear Prediction" May 2009, pp. 534-545, vol. 17, Issue 4, IEEE Transactions on Audio, Speech, and Language Processing.

* cited by examiner (i) Microphone input signal (ii) Signal without reverberation (ideal)

(iii) Signal after dereverberation

DEREVERBERATION PARAMETER ESTIMATION DEVICE AND METHOD, DEREVERBERATION/ECHO-CANCELLATION PARAMETER ESTIMATION DEVICE, DEREVERBERATION DEVICE, DEREVERBERATION/ECHO-CANCELLATION DEVICE, AND DEREVERBERATION DEVICE ONLINE CONFERENCING SYSTEM

TECHNICAL FIELD

The present invention relates to a technical field concerning a noise removal and/or reverberation component removal technology for picking up only a desired sound from sound entering a microphone.

BACKGROUND ART

Studies are being conducted for a dereverberation technology for highly accurately removing, from the sound in a microphone, reverberation components resulting from the reflection of sound by, e.g., walls or the roof of a room, and for picking up only a component that directly reaches the microphone from the speaker's mouth (direct sound) with high accuracy (see Non-Patent Literature 1, for example).

FIG. 1 schematically illustrates a sound propagation process in a room. As illustrated in FIG. 1, the sound emitted from a speaker's mouth and received by a microphone can be largely categorized into a direct sound component which is a component propagating from the speaker's mouth to the microphone in the shortest route (see FIG. 1(i)), and a reverberation component which is a sound component having been reflected or bounced by walls or the floor of a room, or a person in it, before entering the microphone.

According to conventional dereverberation technology, the sound entering the microphone is estimated using an inverse filter of the propagation characteristics as a linear filter, and the estimated linear filter is superimposed on the microphone input signal. In this way, the technology divides the microphone input signal into the direct sound component and the reverberation component, thus extracting only the direct sound component without reverberation. Conventionally, the reverberation component has been considered to be non-fluctuating where the propagation route is not varied over time (see FIG. 1(ii)).

However, in reality, in addition to the non-fluctuating reverberation component, there is a fluctuating reverberation component (see FIG. 1(iii)) which is a component that is reflected by persons (such as their heads), e.g., moving in the room before being transmitted to the microphone. The fluctuating reverberation component may be considered a component that cannot be sufficiently erased by the linear filter. For removing such fluctuating reverberation component, use of a non-linear filter is proposed (see Patent Literature 1, for example).

CITATION LIST

Patent Literature

Patent Literature 1: JP Patent No. 4107613

Non Patent Literature

Non Patent Literature 1: T. Yoshioka et al., "Blind separation and dereverberation of speech mixtures by joint optimization," IEEE Trans. ASLP, vol. 19, no. 1, pp. 69-84, January 2011

Non Patent Literature 2: K. Kinoshita et al., "Suppression of Late Reverberation Effect on Speech Signal Using Long-Term Multiple-step Linear Prediction," IEEE Trans. ASLP, vol. 17, no. 4, pp. 534-545, 2009

SUMMARY OF INVENTION

Technical Problem

In the conventional dereverberation system using the linear filter (see Non Patent Literature 1, for example), the reverberation component is removed on the assumption that the transfer function during transfer of sound from the speaker's mouth to the microphone does not change.

However, in a conference scene, for example, due to the influence of the way the speaker's face is facing or the movement of persons (such as their heads) other than the speaker, the transfer function is often changed over time. In such a case, if the signal used for linear filter estimation contains a time band with a fluctuating transfer function, the transfer function estimation accuracy is lowered, resulting in the problem of a decrease in dereverberation performance (first problem). Further, even if the linear filter is determined with high accuracy, the linear filter is capable of removing reverberation only when the transfer function does not change. Thus, there is the problem of poor reverberation suppression performance in a time band with a fluctuating transfer function (second problem).

Meanwhile, according to the non-linear dereverberation technology using a non-linear filter, the amount of dereverberation can be increased by increasing parameters controlling the amount by which the reverberation component is removed.

However, if the parameters cannot be properly set, the amount of distortion in the sound component that is originally desired to be acquired would be increased, resulting in a decrease in the accuracy of extraction of the desired sound.

The present invention was made in view of such circumstances, and provides a technology for accurately removing non-fluctuating and fluctuating reverberation components from a microphone input signal and estimating a parameter for increasing the accuracy of extraction of direct sound, and a technology for removing the reverberation components from the microphone input signal using the parameter.

Solution to the Problems (i) In order to solve the problems, the present invention proposes an algorithm integrating a dereverberation system using a linear filter and a dereverberation system using a non-linear filter. More specifically, the algorithm includes the function of measuring the amount of fluctuation in transfer function over time in a latter-stage non-linear filter, the strength of the non-linear filter being controlled over time (i.e., parameter generation is controlled) based on the function. In this configuration, a strong non-linear process is implemented only when the fluctuation in transfer function is large, whereby the distortion in the speech components can be minimized. Further, an estimated value of a fluctuating reverberation component obtained by the non-linear process is fed back to a linear filter parameter generation process so as to further increase the accuracy of removal of the non-fluctuating reverberation component.

(ii) FIG. 2 schematically illustrates a method of removing the non-fluctuating reverberation component and the fluctuating reverberation component contained in a microphone. As illustrated in FIG. 2, the non-fluctuating reverberation component, of which the propagation process is not varied, is suppressed by a linear filter corresponding to an inverse filter of the propagation process. Meanwhile, the desired direct sound and the fluctuating reverberation component remain without being suppressed by the linear filter. Thereafter, a spatial/non-linear filtering is performed so as to suppress the fluctuating reverberation component that could not be suppressed by the linear filter, whereby eventually only the desired direct sound can be obtained.

Overall, the present invention provides a configuration such that not only the reverberation component with the unfluctuating propagation process but also the reverberation component with the fluctuating propagation process can be decreased (solution to the first problem). Namely, according to the present invention, an estimated value of a linear dereverberation signal is generated by removing the non-fluctuating reverberation component contained in the speech input signal using the linear filter, and estimated values of the fluctuating reverberation component and the direct sound component contained in the estimated value of the linear dereverberation signal are generated using the non-linear filter. Then, based on the estimated values of the fluctuating reverberation component and the direct sound, parameters of the variation reverberation component and the direct sound component constituting the parameter of the non-linear filter are updated. Further, based on the updated parameters of the fluctuating reverberation component and the direct sound component, the parameter of the linear filter is successively updated.

(iii) By feeding the amount of fluctuation in transfer function over time according to the function back to the estimation of a previous-stage linear filter, and by thus decreasing the weight for a time band in which the transfer function fluctuates in a linear filter estimated value, the influence causing a decrease in the accuracy of transfer function estimation can be decreased (solution to the second problem).

FIG. 3 schematically illustrates differences in the weight over time. When the linear filter is trained, it may be said that the training should be conducted by picking up, as much as possible, only time bands where there is a large presence of the non-fluctuating reverberation component as the object for suppression by the linear filter. Thus, in the weight determination process according to the present invention, a time band in which the direct sound component and the fluctuating component are small is selected so as to enable extraction of only a time band in which the presence of the non-fluctuating reverberation component as the object for training is large.

Additional features related to the present invention will become apparent from the following description in the specification and accompanying drawings. Various aspects of the present invention may be achieved or realized by various elements or various combinations of elements, or by the following description when taken in conjunction with the appended claims.

It should be understood that the descriptions in the present specification merely provide typical illustrative examples and do not in any way limit the scope or applications of the present invention.

Advantageous Effects of Invention

In a video conferencing system in which large rooms are connected according to the present invention, a dereverberation parameter that enables comfortable speech communications with little influence of reverberation and with clear sound can be estimated.

DESCRIPTION OF EMBODIMENTS

The present invention, contemplating utilization in a remote conferencing system used in a large room, for example, provides a technology for removing reverberation noise (non-fluctuating and fluctuating reverberation components) from an input signal to a plurality of microphones, thus providing sound as if collected directly by the microphone at the mouth (direct sound collection). A first embodiment indicates dereverberation parameter estimation and a real-time dereverberation process using the estimation. A second embodiment indicates a process, in a dereverberation process, where a plurality of sets of past dereverberation parameters determined by a dereverberation parameter estimation process are provided, and the optimum filter is selected over time and used. A third embodiment indicates estimation of a parameter for removing reverberation and echo (resonance) and a real-time reverberation and echo removal process using the parameter. A fourth embodiment indicates a dispersion process in which the dereverberation parameter estimation process is executed on the server side.

In the following, the embodiments of the present invention will be described with reference to the attached drawings. In the attached drawings, functionally similar elements may be designated with similar numerals. While the attached drawings indicate concrete embodiments and implementation examples in accordance with the principle of the present invention, these are for the sake of facilitating an understanding of the present invention and are not to be taken for interpreting the present invention in a limited sense.

While the embodiments are described in such sufficient detail as to enable one skilled in the art to implement the present invention, it should be understood that other implementations or modes are also possible, and various modifications of the configurations or structures, or substitution of various elements may be made without departing from the technical scope and spirit of the present invention. Thus, the following description is not to be taken as limiting the present invention.

The embodiments of the present invention may be implemented by software running on a general-purpose computer, or may be implemented by dedicated hardware or a combination of software and hardware.

(1) First Embodiment

<System Configuration at Each Hub>

Figure 4:
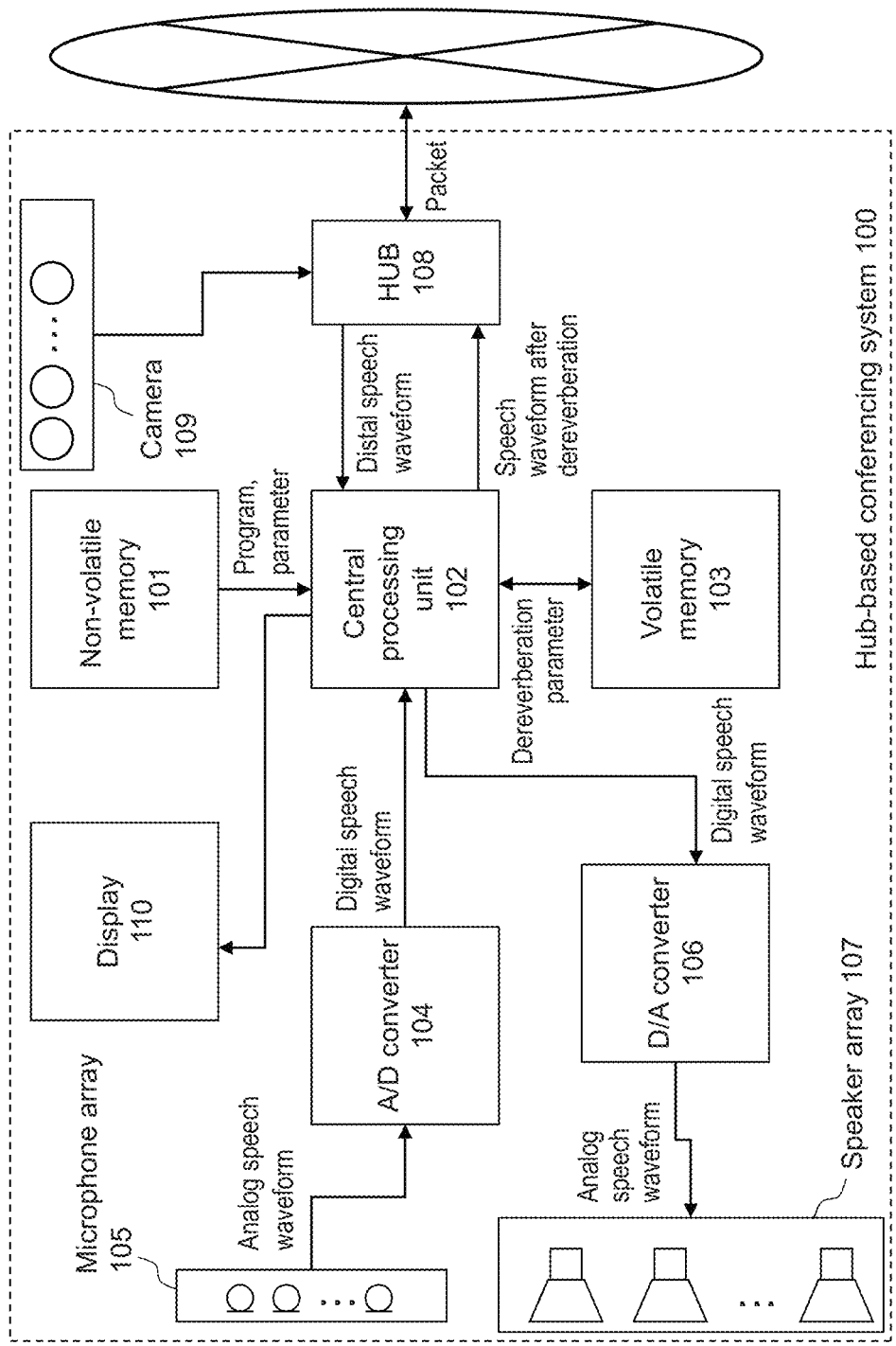
FIG. 4 is a diagram illustrating a schematic configuration of a hub-based conferencing system according to the present invention.

FIG. 4 is a diagram illustrating a schematic hardware configuration of a conferencing system installed at each hub for a remote conference according to a first embodiment of the present invention. In a conferencing system 100 at each hub, a microphone array 105 collects a speech waveform in each conference room. It is contemplated that the microphone array 105 comprises a single microphone or a plurality of microphone elements.

The collected analog speech waveform is converted from an analog signal into a digital signal by an A/D converter 104. The converted digital speech waveform is subjected to a dereverberation process in a central processing unit 102 (which may be referred to as a processor), and then converted into a packet via HUB 108 and sent out to a network.

The central processing unit 102 reads a program stored in a non-volatile memory 101 and parameters used by the program, and executes the program. A working memory used during execution of the program is ensured on a volatile memory 103 where a storage region for various parameters necessary for dereverberation is defined. The dereverberation parameters are estimated by the central processing unit 102, and are stored in the volatile memory 103. The stored reverberation parameters are again read by the central processing unit 102 and used for a new estimation process.

The central processing unit 102 receives the speech waveforms of other hubs (distal) participating in the remote conference from HUB 108 via the network. The received distal speech waveforms (digital speech waveforms) are sent via the central processing unit 102 to a D/A converter 106 where the digital signal is converted into an analog signal. Thereafter, the converted analog speech waveform is emitted from a speaker array 107.

The speaker array 107 is composed of a single speaker element or a plurality of speaker elements. Video information at each hub is captured by a general camera 109 and transmitted to the other hubs via HUB 108. Video information at the other hubs are sent via the network to HUB 108 and displayed on a display 110 installed at each hub via the central processing unit 102. A configuration where a plurality of cameras 109 or a plurality of displays 110 are installed may be adopted.

<Overall Configuration of Remote Conferencing System>

Figure 5:
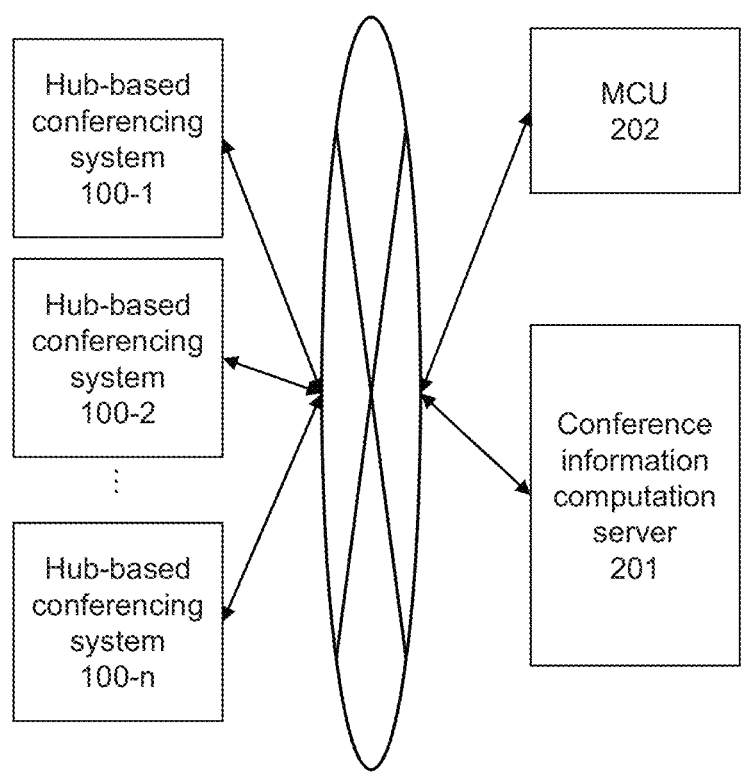
FIG. 5 is a diagram illustrating an overall configuration of a remote conferencing system according to the present invention.

FIG. 5 is a diagram illustrating an overall configuration example of the remote conferencing system of the present invention. The remote conferencing system includes N hub conferencing systems 100-1, 100-2, . . . , and 100-N (N is the number of hubs); MCU 202 that controls the flow of sound or video at each hub; and a conference information computation server 201 that executes computation of, e.g., large amounts of processing that the computer at each hub cannot process. These elements are connected via a network. The system is well known to one skilled in the art and therefore a detailed description of the same will be omitted. The conference information computation server 201 may be configured to execute some of the processes necessary for dereverberation executed in the conferencing system of each hub.

<Dereverberation Process>

Figure 6:
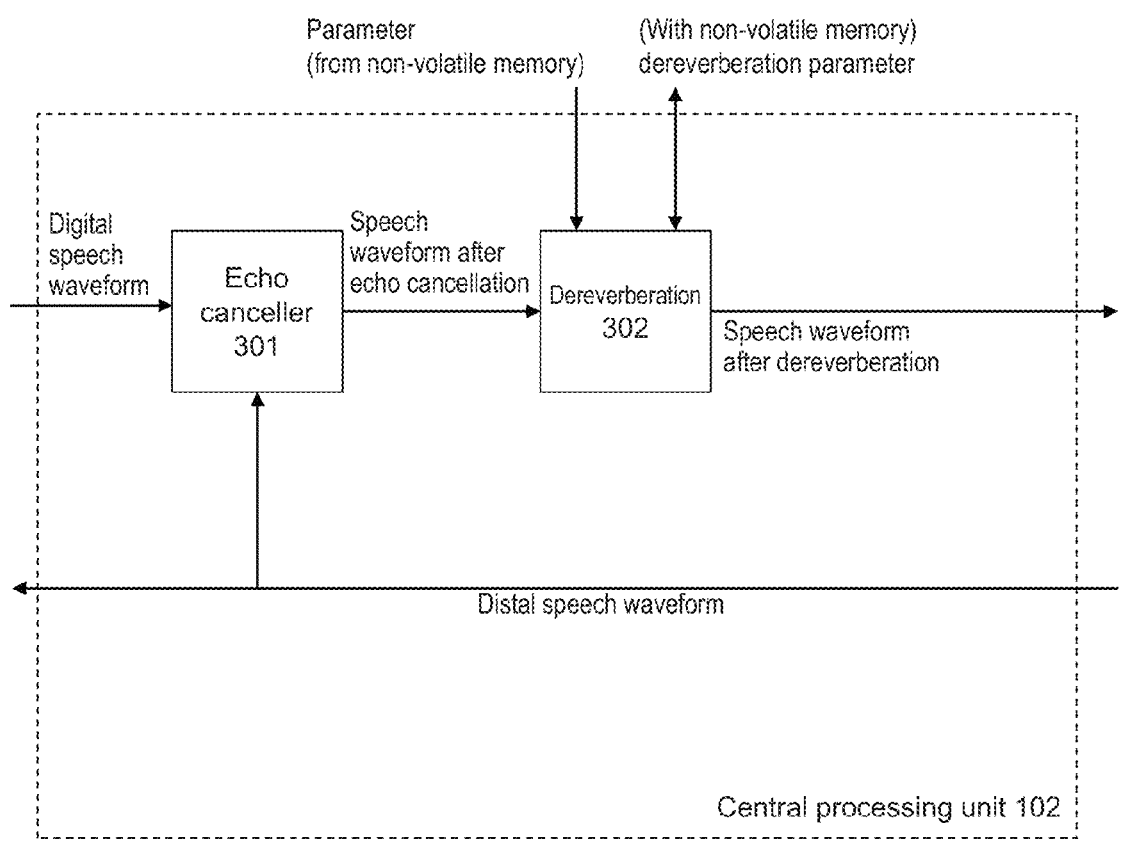
FIG. 6 is a block diagram of a dereverberation program executed in a central processing unit 102.

FIG. 6 is a block diagram of a process (program) executed in the central processing unit 102 according to the first embodiment of the present invention. The digital speech waveform obtained from the microphone array 105 via the A/D converter 104 is processed in an echo canceller 301 to remove an acoustic echo component. The acoustic echo component herein refers to a component that enters the microphone array 105 after the speech waveform output from the speaker array 107 is reflected by a wall or the roof and the like at each hub. The echo canceller 301 may be implemented by one skilled in the art using a well-known configuration for removing the acoustic echo component, such as the NLMS method via HUB 108, for example. As a signal output from the speaker array 107, a distal speech waveform is used.

The speech waveform after echo cancellation is sent to dereverberation 302 where the reverberation component is removed, and the speech waveform from which the reverberation component has been removed is output. Because the speech waveform is a time series signal, the dereverberation program is executed each time a certain amount of the speech waveforms after A/D conversion is accumulated.

<Effect of Dereverberation>

Figure 7:
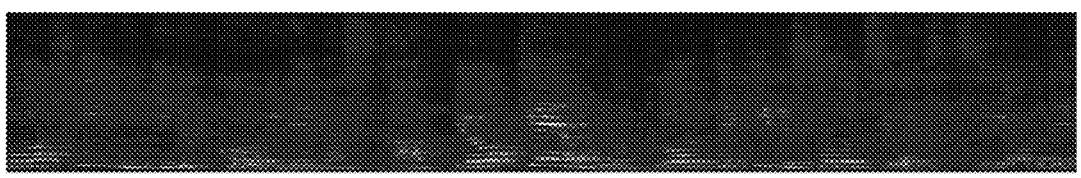
FIG. 7 is a diagram illustrating an example of the effect of dereverberation 302.
Figure 7:
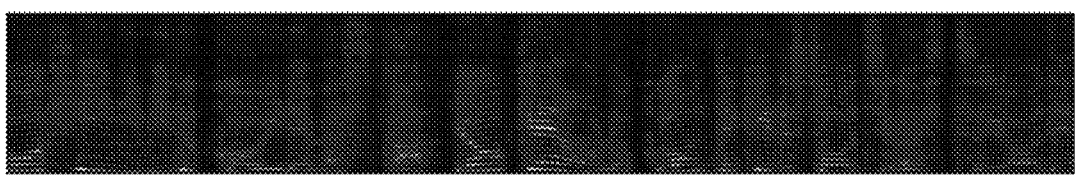
Figure 7:
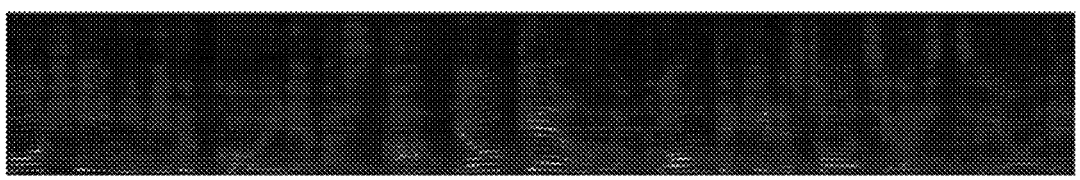
Figure 7:
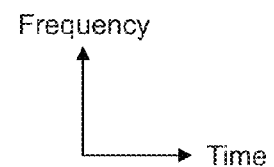

FIG. 7 is a diagram for describing (an example of) the effect of the dereverberation 302. A microphone input signal (see FIG. 7(i)) indicates a spectrogram of the input waveform of one of the microphones constituting the microphone array 105 that has been time-frequency domain transformed. The lateral axis is the time axis, and the vertical axis shows the frequency. In FIG. 7, brighter time-frequency components indicate greater sound volume.

A signal without reverberation (ideal) (see FIG. 7(ii)) indicates the waveform of the direct sound alone without the presence of room reverberation. It is seen from a comparison of the microphone input signal with the signal without reverberation (ideal) that in the former, components are diffused in the time direction like ink bleeding. These components are the reverberation components captured by the present invention.

A signal after dereverberation (see FIG. 7(iii)) has the waveform after the processing in the dereverberation 302 of the present invention. It is seen that the reverberation component is removed and the waveform is closer to the signal without reverberation (ideal).

<Dereverberation Process>

Figure 8:
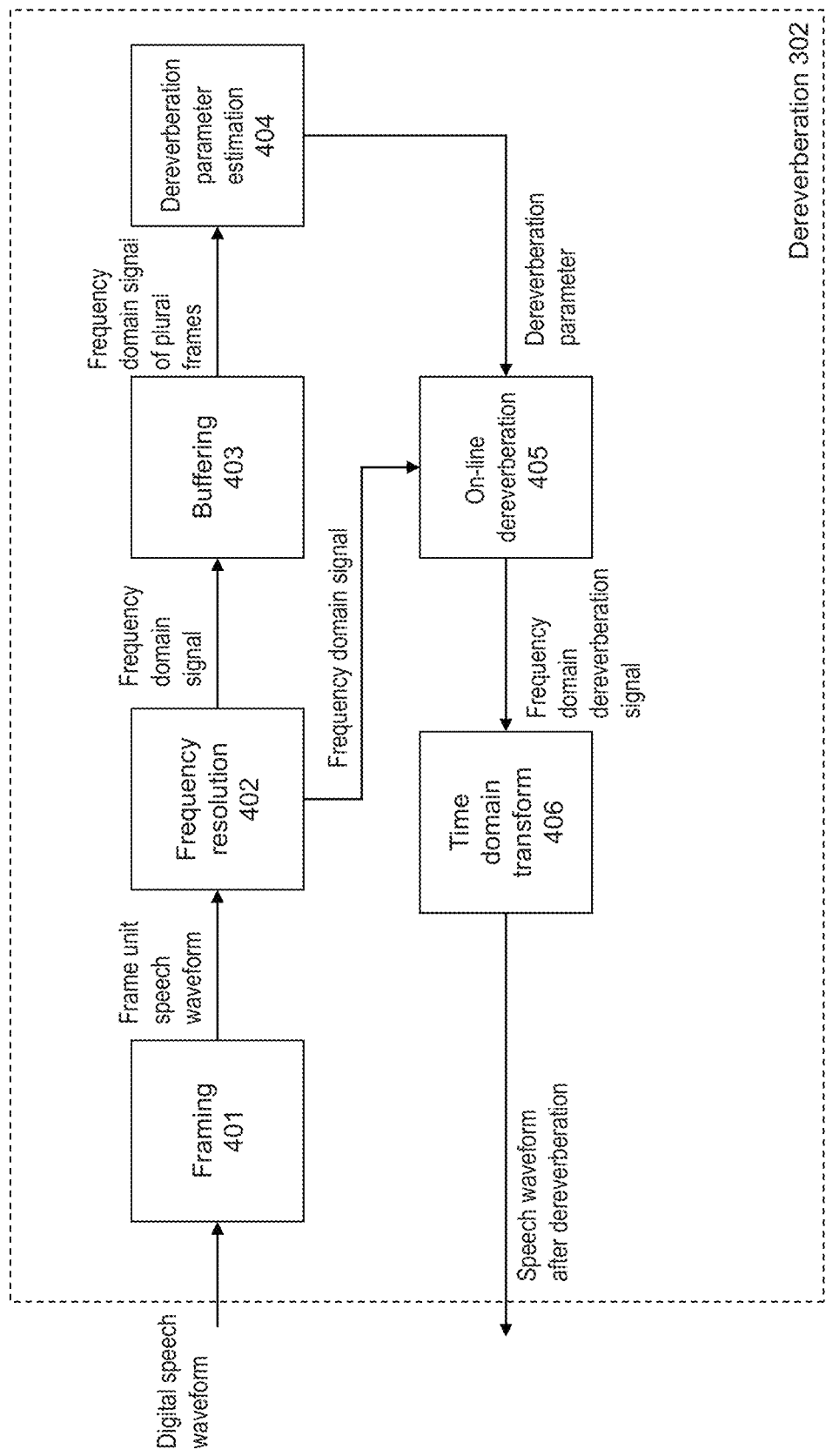
FIG. 8 is a detailed block diagram (corresponding to a flow chart) of dereverberation 302.

FIG. 8 is a detailed block diagram of the dereverberation (process) 302 (see FIG. 6) according to the first embodiment.

(i) Framing Process

As shown in FIG. 8, the digital speech waveform after echo cancellation is sent to a framing (process) 401. Herein, the digital speech waveform will be denoted by q (m, t) where m is an index of the microphones constituting the microphone array 105, and t is a sample index of the A/D conversion process.

The framing 401 outputs a speech waveform on a frame unit basis each time a certain amount of the digital speech waveforms for each microphone element is accumulated. Until the certain amount is accumulated, the framing 401 produces no output. The certain amount will be referred to as a frame shift, denoted by S (point). The frame shift is performed so as to accurately capture the transition of the speech because the speech is transmitted while its frequency component is gradually varied. The speech waveform of each microphone element that is output from the framing 401 is that of P points greater than the frame shift.

The unit of frame is referred to as a frame index and denoted by T. The output signal with the frame index T of the M-th microphone element has the speech waveform from points $t=S\tau$ to $t=S\tau+P-1$, as defined by expression (1).

[Expression 1]

$$k(m,\tau)=[x(m,S\tau) \ldots x(m,S\tau+P-1)] \quad (1)$$

Figure 9:
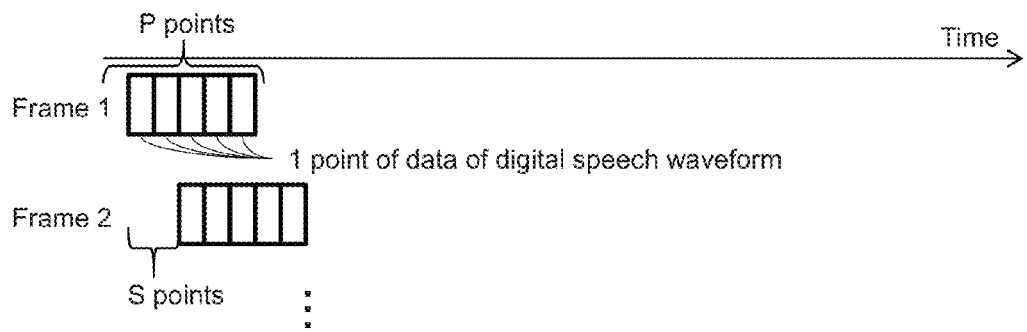
FIG. 9 is a diagram for describing data acquisition in each microphone.

FIG. 9 is a diagram for describing frame formation and frame shift processes. When the frame index is 1, "frame 1" is composed of the speech waveforms for P points of data immediately after the start of data acquisition. The next frame "frame 2" is composed of the speech waveforms for P points of data from a point shifted from frame 1 by S points.

The framing 401 outputs the frame unit speech waveform k (m, t) for each microphone element.

(ii) Frequency Resolution Process

A frequency resolution (process) 402 transforms the speech waveform of each microphone element into a time frequency domain signal by means of a frequency transform process generally employed by those skilled in the art, such as by Fourier transform process. The m-th frame unit signal transformed into a time frequency domain signal is defined as Xm (f, τ), where f is a frequency index in the time frequency domain. A vector consolidating the time domain signals of each microphone on a time frequency basis is denoted as X (f, τ)=[X1(f, τ), X2(f, τ), ..., Xm(f, τ), ..., XM (f, τ)], where M is the number of microphones. A frequency-domain signal of each microphone is sent to a buffering (process) 403 and an on-line dereverberation (process) 405.

(iii) Buffering Process

The buffering (process) 403 accumulates the time domain signal and outputs an accumulated signal only when the accumulated amount has reached a certain amount; otherwise, the process produces no output. The amount accumulated in each microphone is T frames (such as 300 frames). Because a parameter estimation cannot be properly (stably) performed unless a certain statistical amount is used, a reverberation parameter estimation process is executed after the T frames of sound data is accumulated. If the speakers are switched during the conference, for example, the dereverberation parameter that has been being used in the on-line dereverberation 405 would not be appropriate any more. Thus, in this case the parameter estimation is executed again so as to update the parameter. However, since it is difficult to detect the switching of speakers from the speech waveform alone, the dereverberation parameter is updated at T frame intervals according to the present embodiment. In other words, in the present embodiment, once the parameter is estimated, the dereverberation process is executed using the current parameter until the end of the next parameter estimation process. Namely, in the dereverberation process according to the present embodiment, the latest estimation parameter is used at all times. As long as the switching of the speakers can be detected, the dereverberation parameter may be updated at the speaker switch timing.

(iv) Dereverberation Parameter Estimation Process

A dereverberation parameter estimation (process) 404, based on the T frames of data output from the buffering 403, estimates the parameter for dereverberation and outputs the estimated parameter. The further details of the dereverberation parameter estimation (process) 404 will be described later with reference to FIG. 11.

(v) On-Line Dereverberation Process

The on-line dereverberation (process) 405 exploits the estimated dereverberation parameter in real-time. While the dereverberation parameter estimation 404 implements a process each time the T frames of data are accumulated, the on-line dereverberation 405 needs to perform dereverberation in real-time. Thus, the on-line dereverberation 405 implements a process for every one frame of data. The on-line dereverberation 405 outputs a signal obtained after removing the reverberation component from one frame of data containing reverberation.

Figure 10:
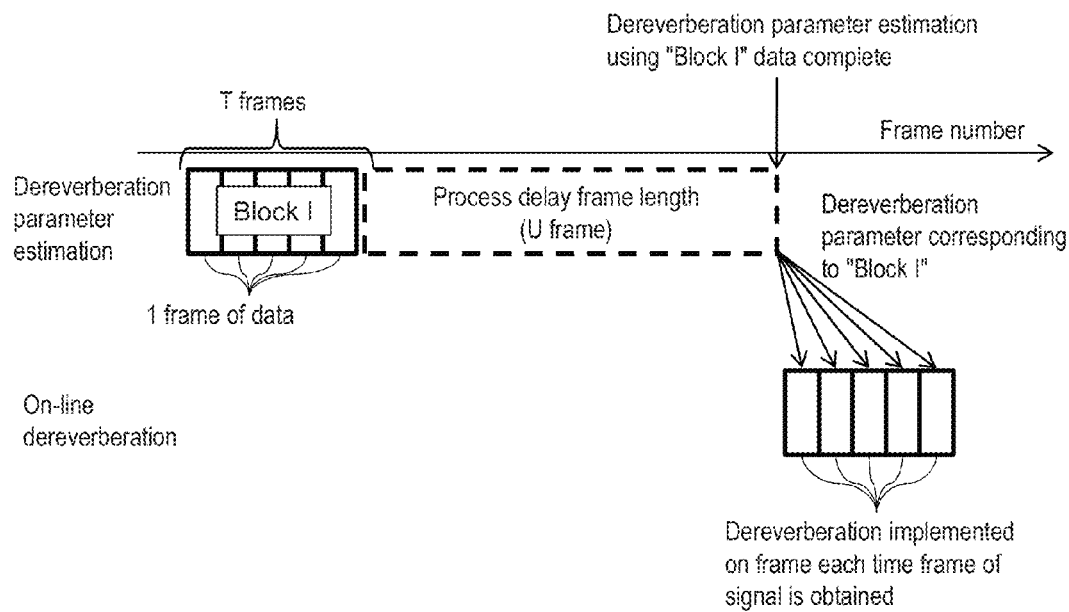
FIG. 10 is a timing chart of execution timing of dereverberation parameter estimation 404 and on-line dereverberation 405.

FIG. 10 is a timing chart for describing the execution timing of the dereverberation parameter estimation 404 and the on-line dereverberation 405. In the dereverberation parameter estimation 404, as described above, the parameter estimation process is executed each time the T frames of data is obtained. Each process delay frame length (U frame) before the estimated parameter begins to be used in the on-line dereverberation 405 depends on the processing amount in the dereverberation parameter estimation 404 and may vary.

The on-line dereverberation 405 implements dereverberation of the time domain signal of each frame using the latest dereverberation parameter obtained at the point in time of processing.

By adopting such configuration, dereverberation can be executed in real-time even when the estimation of the dereverberation parameter is delayed.

(vi) Time Domain Transform Process

Referring back to FIG. 8, a time domain transform (process) 406 executes a frequency-domain to time-domain transform process, such as inverse Fourier transform, on one frame of frequency-domain signal for each microphone, thus returning the signal back to a time domain signal, and outputs the time domain signal as a speech waveform after dereverberation. By executing the time domain transform process, the speech power in an overlapping region of (P-S) points in each frame can be adjusted.

<Details of Dereverberation Estimation Parameter Process>

Figure 11:
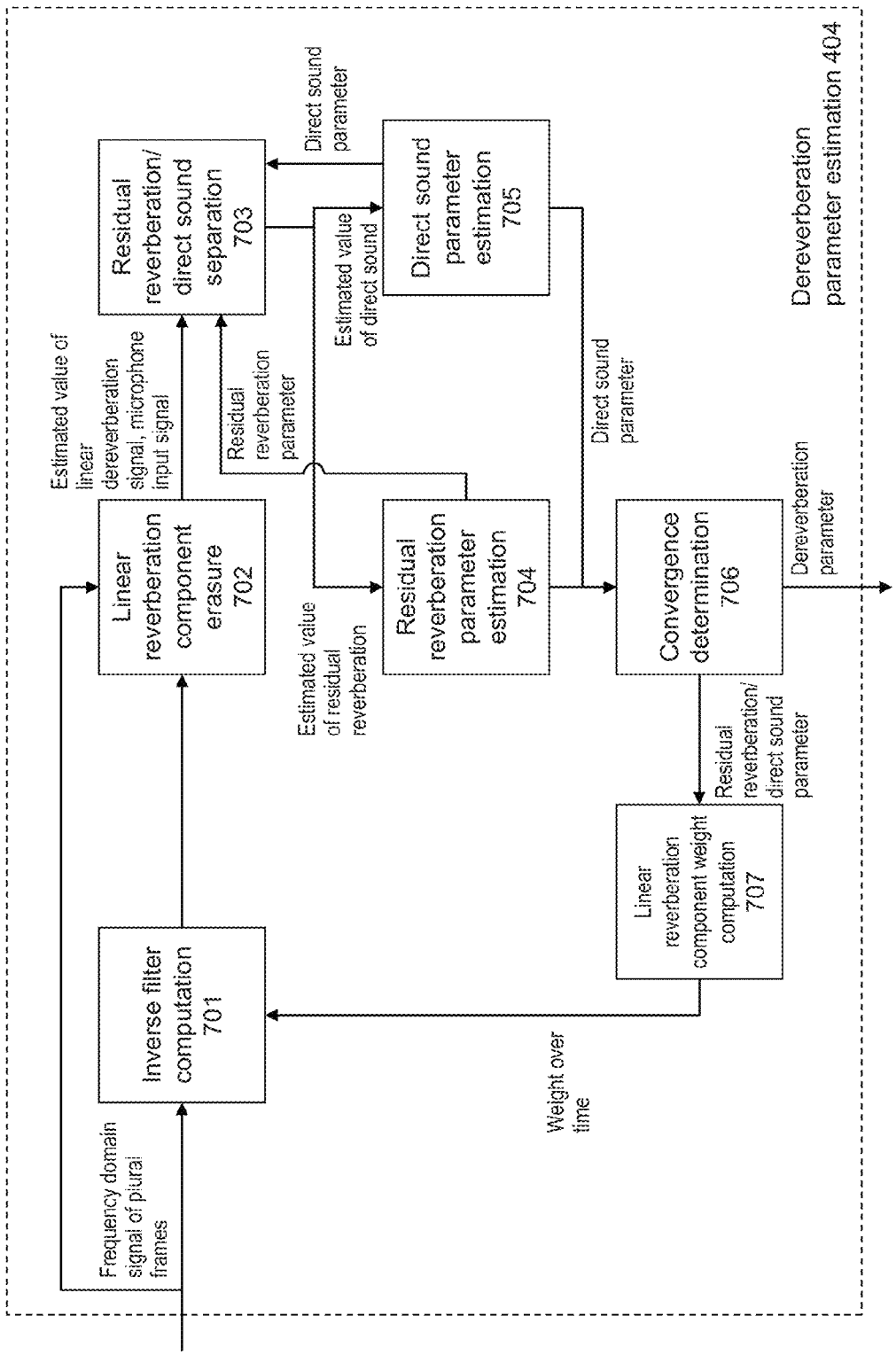
FIG. 11 is a detailed block diagram (corresponding to a flow chart) of dereverberation parameter estimation 404.

FIG. 11 is a detailed block diagram of the dereverberation parameter estimation (process) 404. The dereverberation parameter estimation 404 is configured to successively increase the dereverberation performance by repetitive computation. Namely, in the present embodiment, when two types of parameters X and Y (herein X is a non-fluctuating dereverberation parameter and Y is a fluctuating dereverberation parameter) are to be determined, Y is varied to determine a proper Y value while X is initially fixed. Then, X is varied to determine a proper X value. FIG. 11 illustrates such process of alternately determining X and Y and having them converge. In the dereverberation parameter estimation 404, the process is performed independently for each frequency index. Thus, a configuration is also possible where the present dereverberation parameter estimation process is executed by a different central processing unit (processor) for each frequency.

(i) Inverse Filter Computation Process

The T frames of data for each microphone obtained for each frequency is first sent to an inverse filter computation (process) 701 where a linear filter for dereverberation is computed.

Figure 12:
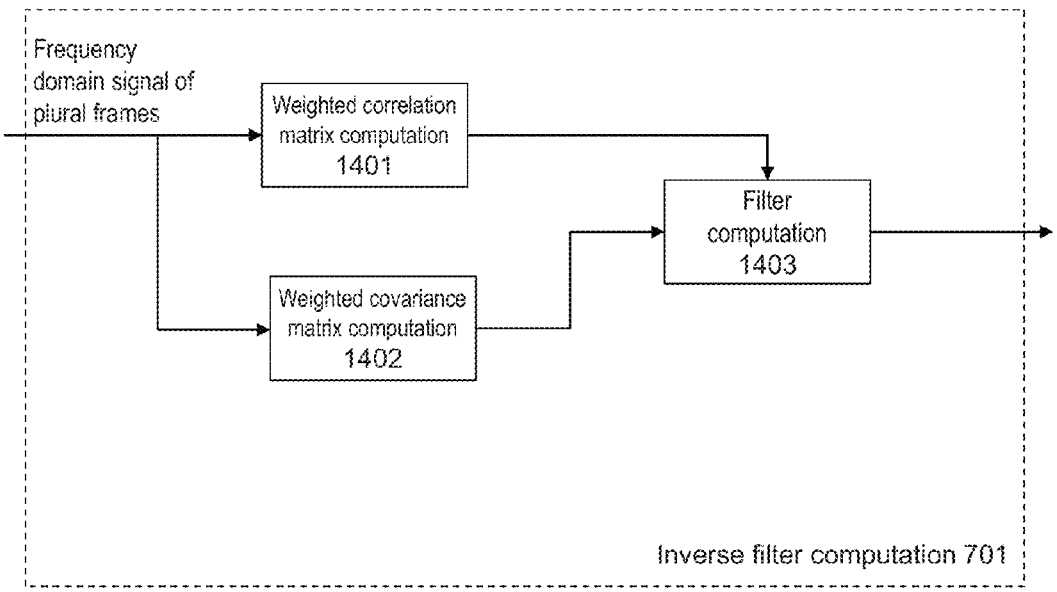
FIG. 12 is a detailed block diagram (corresponding to a flow chart) of inverse filter computation 701.

FIG. 12 is a diagram illustrating a detailed configuration of the inverse filter computation (process) 701.

A filter computation (process) 1403 computes a linear filter according to expression (2). Because the reverberation component is a component deriving from past signals, expression (2) is an arithmetic expression for computing the degree of correlation between a current signal and past signals and between the past signals. If only the correlation of the current signal and the past signals is determined, too much of the past signal may be removed from the current signal. Thus, in order to avoid excessive signal removal, the correlation between the past signals is also taken into consideration in the computation. The operation for computing the correlation is executed for T frames of speech signal.

[Expression 2]

$$A_f = ivec(P_f^{-1} Q_f) \quad (2)$$

When $\tau(i)$ is the frame index for the i-th data in the T frames of data, $P_f$ in expression (2) is a weighted covariance matrix, which is defined by expression (3) in a weighted covariance matrix computation 1402. Expression (3) is an arithmetic expression for computing the correlation between the past signals, where H is an operator expressing the conjugate transposition of a matrix or a vector.

[Expression 3]

$$P_f = \left( \sum_{i=1}^{T} (U_{f,\tau(i)} U_{f,\tau(i)}^H)' \otimes R_{x,f,\tau(i)}^{-1} \right) \quad (3)$$

Further, $Q_f$ in expression (2) is computed according to expression (4) in a weighted correlation matrix computation 1401. Expression (4) is an arithmetic expression for computing the correlation between the current signal and the past signals.

[Expression 4]

$$Q_f = vec\left( \sum_{i=1}^{T} R_{x,f,\tau(i)}^{-1} x_{f,\tau(i)} U_{f,\tau(i)}^H \right) \quad (4)$$

In expression (3), "'" indicates an operator expressing the transposition of a matrix or a vector. In expression (3), $\otimes$ is an operator expressing the Kronecker delta product.

Further, in expression (3), $U_{f,\tau(i)}$ is defined by expression (5).

[Expression 5]

$$U_{f,\tau(i)} = [x_{f,\tau(i)-D}^H \ldots x_{f,\tau(i)-L_1}^H]^H \quad (5)$$

Let D and L1 be initially determined parameters. Desirably, D is set to a frame length corresponding to early reverberation in the reverberation component. L1 is a parameter corresponding to a continuous frame length of late reverberation, and is desirably set to a large value in an environment where late reverberation is large. $R_{x,f,\tau(i)}$ is a matrix output by a linear reverberation component weight computation 707. If the linear reverberation component weight computation (process) 707 is not performed, or if the inverse filter computation 701 is executed for the first time for every T frames of data, $R_{x,f,\tau(i)}$ is set to a unit matrix. In expression (2), "vec" is an operator for transforming a matrix into a vector. An example of transform of matrix A into a vector by the vec operator is expressed by expression (6).

[Expression 6]

$$vec(A) = [a_{11} a_{21} \ldots a_{12} a_{22} \ldots a_{1n} a_{2n} \ldots]^T \quad (6)$$

In expression (6), $a_{mn}$ means a component of row m and column n of matrix A. "ivec" is an inverse operator of the vec operator and transforms a vector into a matrix. When transforming to a matrix, while there is arbitrariness in the number of tows, it is assumed that in expression (2), a matrix such that the number of rows of the matrix that is output corresponds to the number of microphones is output. $A_f$ determined by expression (2) is segmented on a block by block basis according to expression (7).

[Expression 7]

$$A_f = [W_{f,D} \ldots W_{f,L_1}] \quad (7)$$

The inverse filter computation 701 outputs $A_f$ and ends the process.

(ii) Linear Reverberation Component Erasure Process

A linear reverberation component erasure (process) 702 acquires, according to expression (8), a signal $g_{f,\tau(i)}$ from which the non-fluctuating reverberation component has been removed utilizing the Af output from the inverse filter computation 701.

[Expression 8]

$$g_{f,\tau(i)} = x_{f,\tau(i)} - \sum_{l=D}^{L_1} W_{f,l} x_{f,\tau(i)-l} \quad (8)$$

The linear reverberation component erasure (process) 702 may be considered, qualitatively, a system for obtaining a dereverberation signal on a channel by channel basis by operating a separate FIR filter on a microphone channel basis.

Figure 13:
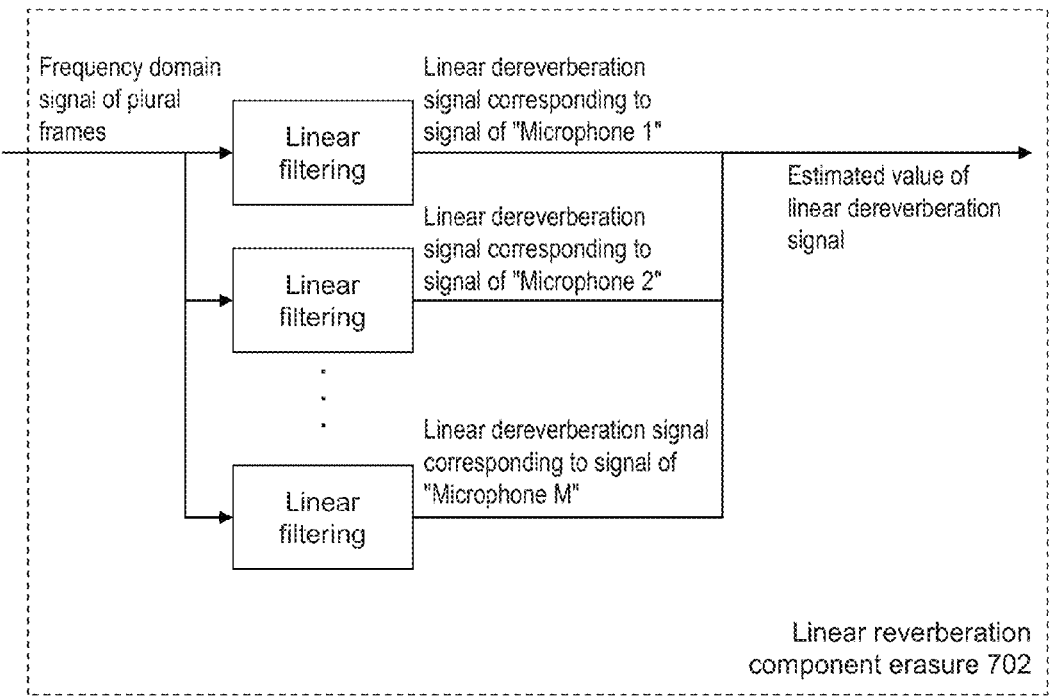
FIG. 13 is a conceptual diagram illustrating a configuration for performing dereverberation on a microphone channel basis.

FIG. 13 illustrates a conceptual configuration for the dereverberation on a microphone channel basis. Thus, the linear dereverberation process according to the present embodiment is executed for all of the T frames of time frequency signals. The signal after the linear dereverberation is sent to a residual reverberation/direct sound separation 703.

(iii) Residual Reverberation/Direct Sound Separation Process

The residual reverberation/direct sound separation (process) 703 separates the signal after linear dereverberation into direct sound and reverberation sound (estimated values).

Figure 14:
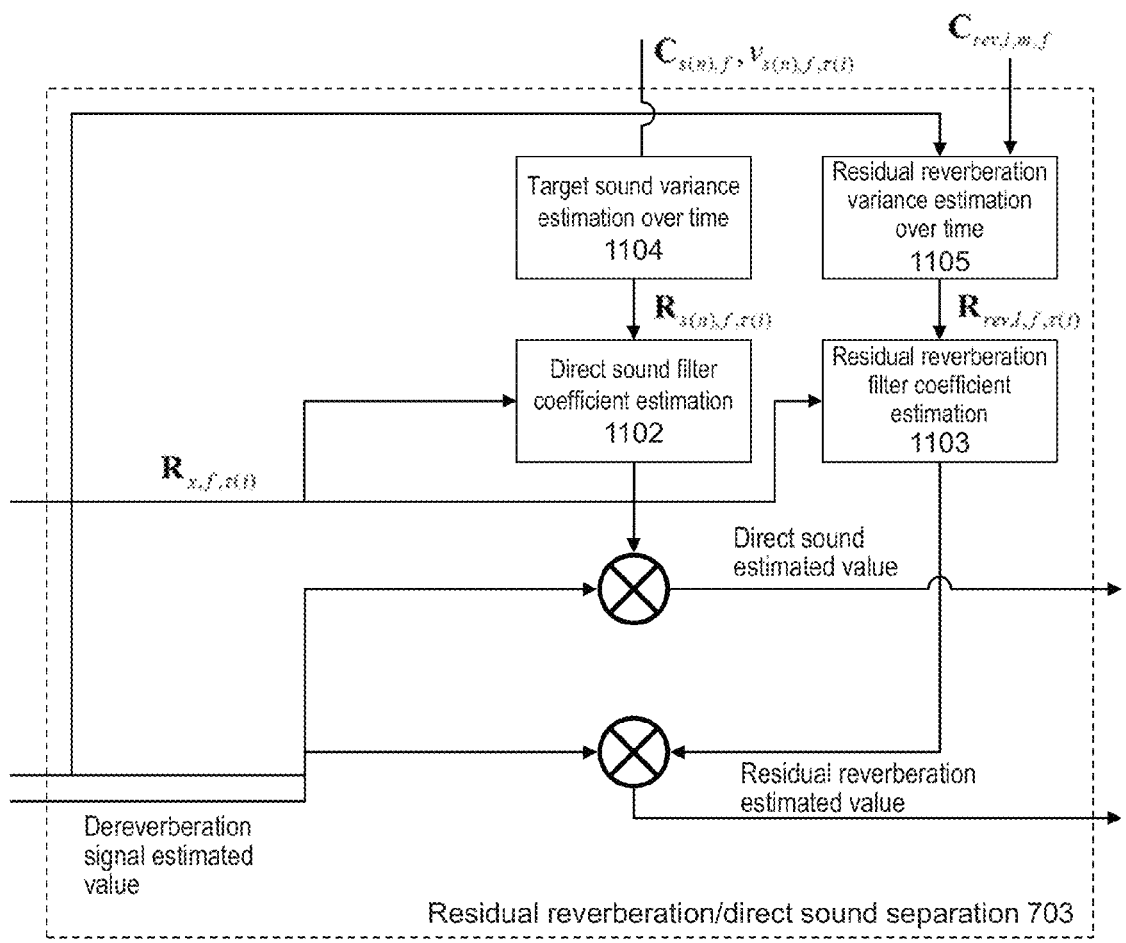
FIG. 14 is a diagram illustrating a concrete block configuration (corresponding to a flow chart) of residual reverberation/direct sound separation 703.

FIG. 14 is a detailed block diagram of the residual reverberation/direct sound separation 703. The residual reverberation/direct sound separation process is also executed for all of the T frames of time frequency signals.

The estimated value of the dereverberation signal for each frame is computed according to expression (9) by superimposing the filter coefficient $W_{n,f,\tau(i)}$ estimated by a direct sound filter coefficient estimation 1102 on the time frequency signal of each frame.

[Expression 9]

$$y_{n,f,\tau(i)} = W_{n,f,\tau(i)} g_{f,\tau(i)} \quad (9)$$

where n is a fluctuating indicating an index of the sound source, and is an integer of 1 to N. N is the number of sound sources. Even when there is a plurality of sound sources, the dereverberation and the direct sound separation can be performed for a plurality of sound sources simultaneously by setting N to 2 or more.

Referring to FIG. 14, the direct sound filter estimation (process) 1102 computes, using expression (10) and for each sound source, a filter (mirror filter) $W_{n,f,\tau(i)}$ for extracting the direct sound. Expression (10) is substantially equivalent to determining the ratio of direct sound power to overall power (direct sound power/(direct sound power+residual reverberation power)).

[Expression 10]

$$W_{n,f,\tau(i)} = R_{s(n),f,\tau(i)} R_{x,f,\tau(i)}^{-1} \quad (10)$$

where $R_{s(n),f,\tau(i)}$ is a covariance matrix for each sound source and for each frame, and is computed using expression (11) in a target sound variance estimation over time (process) 1104.

[Expression 11]

$$R_{s(n),f,\tau(i)} = v_{s(n),f,\tau(i)} C_{s(n),f} \quad (11)$$

where $v_{s(n),f,\tau(i)}$, and $C_{s(n),f}$ are parameters related to the n-th direct sound component, which parameters are successively updated during repetitive computation. The initial value of $v_{s(n),f,\tau(i)}$ is 1, and $C_{s(n),f}$ is a random positive definite Hermitian matrix.

Thus, the residual reverberation component is computed according to expression (12) by superimposing $W_{rev,l,m,f,\tau(i)}$ on the time frequency signal of each frame.

[Expression 12]

$$y_{rev,l,m,f,\tau(i)} = W_{rev,l,m,f,\tau(i)} g_{f,\tau(i)} \quad (12)$$

where l is an index corresponding to a tap index of the inverse filter, and m is a microphone index. Namely, the residual reverberation component is computed for each tap index of the inverse filter and microphone index. In a residual reverberation filter coefficient estimation 1103, $W_{rev,l,m,f,\tau(i)}$ is computed according to expression (13). Expression (13) is substantially equivalent to determining the ratio of residual reverberation power to overall power (residual reverberation power/(direct sound power+residual reverberation power)).

[Expression 13]

$$W_{rev,l,m,f,\tau(i)} = R_{rev,l,m,f,\tau(i)} R_{x,f,\tau(i)}^{-1} \quad (13)$$

where $R_{rev,l,m,f,\tau(i)}$ is a covariance matrix for each tap index of the inverse filter and each frame, and is computed according to expression (14) in a residual reverberation variance estimation over time (process) 1105.

[Expression 14]

$$R_{rev,l,m,f,\tau(i)} = |x_{f,\tau(i)-1}(m)|^2 C_{rev,l,m,f} \quad (14)$$

where $X_{f,\tau(i)}(m)$ is a time frequency domain signal of the m-th microphone with frequency index f and frame index $\tau(i)$. $C_{rev,l,m,f}$ is a covariance matrix of the residual reverberation component for each tap index and microphone index, and is a parameter that is successively updated in repetitive computation. The initial value is a random positive definite Hermitian matrix.

As described above, the estimated values of the separated residual reverberation and direct sound are respectively sent to the residual reverberation parameter estimation (process) 704 and the direct sound parameter estimation (process) 705.

(iv) Reverberation Parameter Estimation Process

Figure 15:
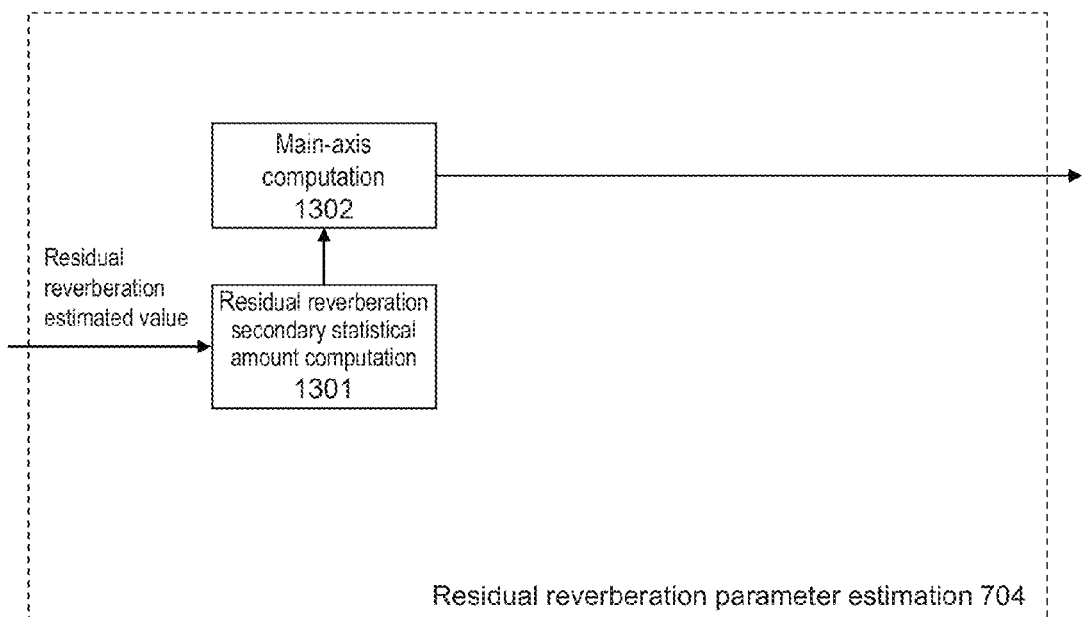
FIG. 15 is a detailed block diagram (corresponding to a flow chart) of residual reverberation parameter estimation 704.

The residual reverberation parameter estimation (process) 704 estimates a parameter such as a statistical amount of the fluctuating reverberation component. FIG. 15 is a diagram illustrating the details of the residual reverberation parameter estimation (process) 704.

In FIG. 15, a residual reverberation secondary statistical amount computation (process) 1301 applies expression (15) to the estimated value of the residual reverberation sent from the residual reverberation/direct sound separation 703, and computes a secondary statistical amount (residual reverberation power) of the residual reverberation component for each frame.

[Expression 15]

$$V_{rev,l,m,f,\tau(i)} = y_{rev,l,m,f,\tau(i)} y_{rev,l,m,f,\tau(i)}^H + (I - W_{rev,l,m,f,\tau(i)}) R_{rev,l,m,f,\tau(i)} \quad (15)$$

$V_{rev,l,m,f,\tau(i)}$ is sent to a main axis computation (process) 1302, and $C_{rev,l,m,f}$ is updated by expression (16).

[Expression 16]

$$C_{rev,l,m,f} = \sum_{i=1}^{T} \frac{1}{|x_{f,\tau(i)}(m)|^2} V_{rev,l,m,f,\tau(i)} \quad (16)$$

(v) Direct Sound Parameter Estimation Process

Figure 16:
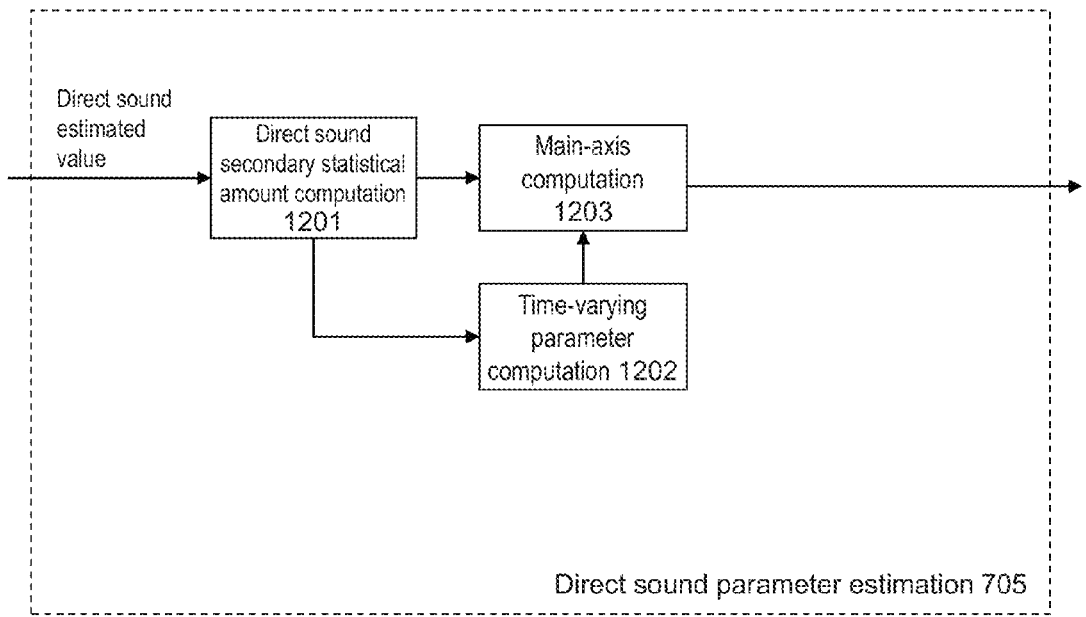
FIG. 16 is a detailed block diagram (corresponding to a flow chart) of direct sound parameter estimation 705.

The direct sound parameter estimation (process) 705 estimates a parameter such as a statistical amount of the direct sound. FIG. 16 is a diagram illustrating the details of the direct sound parameter estimation 705.

In FIG. 16, a direct sound secondary statistical amount computation (process) 1201 applies expression (17) to the estimated value of the residual reverberation sent from the residual reverberation/direct sound separation 703, and computes a covariance matrix of the direct sound of each frame of each sound source (the power of the direct sound input to each microphone and a time difference component before a signal reaches each microphone).

[Expression 17]

$$V_{s(n),f,\tau(i)} = y_{n,f,\tau(i)} y_{n,f,\tau(i)}^H + (I - W_{n,f,\tau(f)}) R_{s(n),f,\tau(i)} \quad (17)$$

A time-varying parameter computation 1202 updates $v_{s(n),f,\tau(i)}$ according to expression (18). The time-varying parameter herein refers to information including a time difference before the direct sound reaches the N microphones.

[Expression 18]

$$v_{s(n),f,\tau(i)} = \frac{1}{M} \mathrm{trace}(C_{s(n),f}^{-1} V_{s(n),f,\tau(i)}) \quad (18)$$

Further, a main axis computation 1203 updates $C_{s(n),f}$ according to expression (19). The main axis computation herein refers to the determination of the main axis (dispersion of power of the direct sound input to each microphone) of an N-dimensional manifold (ellipse) in N-dimensions (N microphones) in consideration of the time difference before the direct sound reaches the N microphones.

[Expression 19]

$$C_{s(n),f} = \sum_{i=1}^{T} \frac{1}{v_{s(n),f,\tau(i)}} V_{s(n),f,\tau(i)} \quad (19)$$

For example, when a plurality of microphones is installed in a conference room, if a speaker talks from a specific direction, the power of the speech signal input to each microphone in each frame time is greater the closer the microphone is to the speaker. The main axis computation 1203 is a process for computing the dispersion in power of the speech signal reaching each microphone, while the time-varying parameter computation 1202 is a process of computing the time difference of the speech signal (direct sound) before reaching each microphone. More specifically, when two microphones m1 and m2 are installed, the main axis is expressed by the slope of a line connecting the origin and a plot of the power of the speech signal reaching m1 and m2 on a m1-m2 plane, with the length of the main axis (distance between the origin and the plot) representing the time-varying parameter (time difference).

(vi) Convergence Determination Process

The direct sound parameter and the residual reverberation parameter that have been estimated are sent to a convergence determination (process) 706.

The convergence determination 706 determines whether the computation has converged based on the same criterion as in the case of a general repetitive computation, such as whether the repetitive computation has been executed a predetermined number of times, or whether the difference in the estimated parameter value and the value before estimation is a predetermined value or less. If converged, the dereverberation parameter is output, and the block of the dereverberation parameter estimation 404 ends.

If not converged, the process transitions to the linear reverberation component weight computation 702.

(vii) Linear Reverberation Component Weight Computation Process

Figure 1:
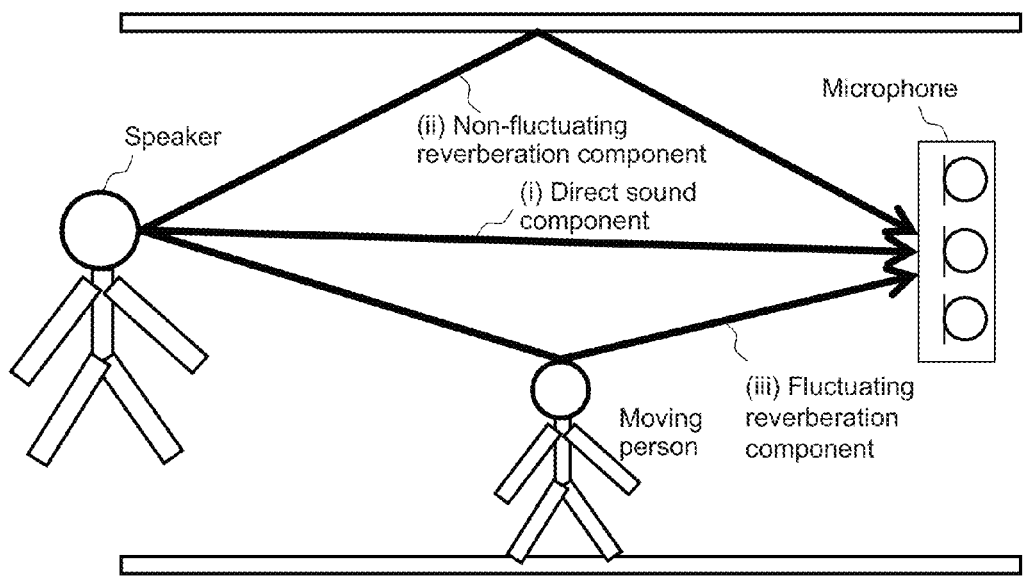
FIG. 1 is a schematic diagram for describing a sound propagation process.
Figure 2:
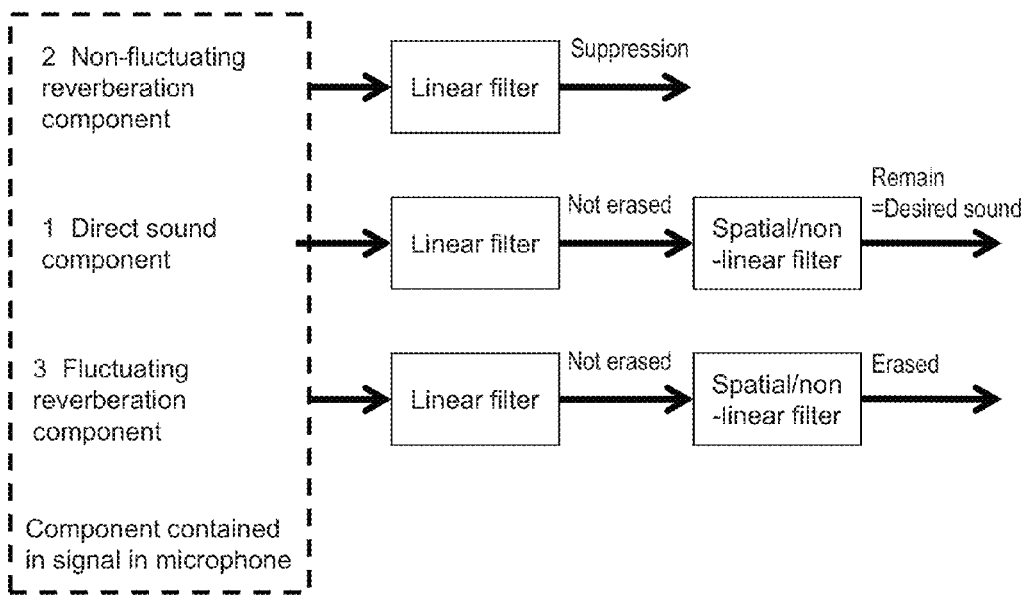
FIG. 2 is a schematic diagram for describing a process of removal of non-fluctuating reverberation component and fluctuating reverberation component contained in a microphone (basic concept of the present invention).
Figure 3:
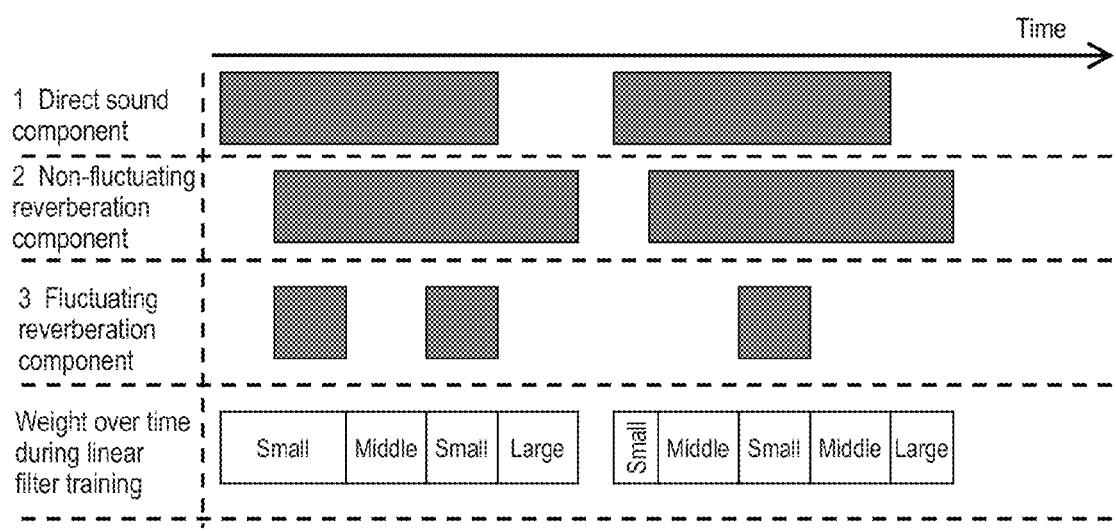
FIG. 3 is a schematic diagram for describing the difference in the magnitude of weight over time.

Because the power of the direct sound or residual reverberation (fluctuating reverberation component) varies over time, the power is learned as a fluctuating by the process of FIG. 11 as described above. Thus, it can be known in which frame among the T frames the power of direct sound or residual reverberation is large (see FIG. 3). The greater the power (the sum of the power of direct sound or residual reverberation), the greater the fluctuating component. Thus, it is advisable not to use the corresponding time band as information for determining the inverse filter parameter. Thus, herein, a weight coefficient which is proportional to the inverse of the magnitude of the power (the sum of direct sound power or residual reverberation power) is used, for example.

The linear reverberation component weight computation (process) 707 updates $R_{x,f,\tau(i)}$ according to expression (20), where N is the number of sound sources.

[Expression 20]

$$R_{x,f,\tau(i)} = \sum_{n=1}^{N} v_{s(n),f,\tau(i)} C_{s(n),f} + \sum_{m=1}^{M} \sum_{l=D}^{L_1} |x_{f,\tau(i)-l}(m)|^2 C_{rev,l,m,f} \quad (20)$$

The weight over time is fed back to the inverse filter computation 701. In the initial stage of operation, the power of each component in each time band cannot be estimated, so that the operation is started with the weight coefficient set to 1. By repeating the operation of FIG. 11, the weight coefficient can be caused to converge to an appropriate value.

<Details of On-Line Dereverberation Process>

Figure 17:
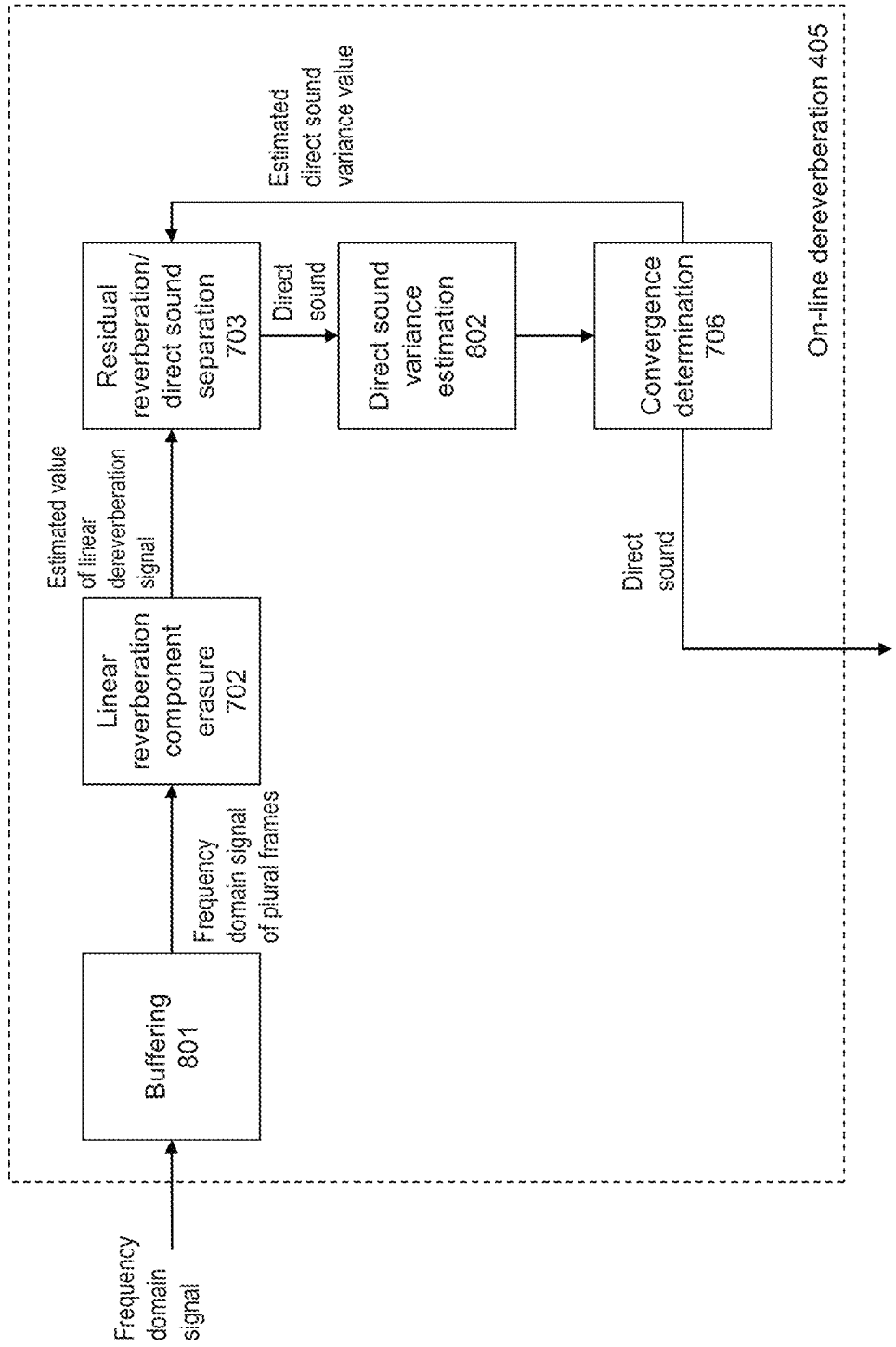
FIG. 17 is a diagram illustrating a concrete configuration (corresponding to a flow chart) of on-line dereverberation 405.

FIG. 17 is a diagram illustrating a concrete configuration of the on-line dereverberation (process) 405. The on-line dereverberation (process) 405 is configured to increase the parameter estimation accuracy by successive computation.

(i) Buffering Process

A buffering (process) 801 stores the time frequency domain signal of each frame in the volatile memory 103. According to the present embodiment, the stored time frequency domain signal is L1 frames (such as 5 frames) in the T frames of signals counted from the latest time domain signal.

When the speech signal of a certain frame is obtained, the signal of a past frame is required for removing the reverberation component of the frame. Thus, the buffering process 801 accumulates a predetermined frames of speech signals to provide a processing object.

(ii) Linear Reverberation Component Erasure Process

The linear reverberation component erasure (process) 702 receives the stored L1 frames of time domain signals, and removes the reverberation component using an inverse filter. The inverse filter applied here is the filter included in the dereverberation parameter output by the dereverberation parameter estimation (process) 404.

(iii) Residual Reverberation/Direct Sound Separation Process

The residual reverberation direct sound separation (process) 703 receives the reverberation component removed signal from the linear reverberation component erasure (process) 702, separates the signal into direct sound and a residual reverberation component, and outputs the direct sound. At this time, the initial value of $v_{s(n),f,\tau}$ is 1, and $C_{s(n),f}$ is the covariance matrix included in the dereverberation parameter output by the dereverberation parameter estimation (process) 404.

(iv) Direct Sound Separation Estimation Process

Because the power of the speech signal varies over time, it is necessary to estimate the value of the speech power over time. For example, the sound volume output over time is varied even if generated by the same speaker, and therefore its power varies. Thus, the estimated value needs to be updated in real-time. Accordingly, in a direct sound separation estimation (process) 802, only some of the parameters (direct sound parameter) in the non-linear parameters are estimated in real-time. Then, for the portion that varies in real-time over time, the estimation process is repeated to increase the accuracy of the estimated value. With regard to the parameters for residual reverberation (fluctuating reverberation component), the time variation can be considered to be small. Thus, the parameters learned in the past frame may be used as is.

In FIG. 17, the direct sound variance estimation (process) 802, in a flow similar to that of the direct sound parameter estimation 705 in the residual removal parameter estimation 404, computes $v_{s(n),f,\tau(i)}$ in the frame of the processing object according to expression (21) (the same expression as expression (18)).

[Expression 21]

$$v_{s(n),f,\tau} = \frac{1}{M}\text{trace}(C_{s,f}^{-1} V_{s(n),f,\tau(i)}) \quad (21)$$

(v) Convergence Determination Process

The convergence determination (process) 706, using parameters such as the estimated direct sound variance, performs a convergence determination on the determined parameter. If it is determined that there is convergence, the convergence determination (process) 706 outputs an estimated direct sound and ends the process. Otherwise, the convergence determination (process) 706 again executes the residual reverberation/direct sound separation (process) 703 on the basis of the estimated direct sound variance.

The determination as to whether there is convergence is as described with reference to FIG. 11.

(2) Second Embodiment

A second embodiment discloses a configuration in which, in the dereverberation (process) 302, a plurality of sets of the past dereverberation parameters determined in the dereverberation parameter estimation (process) 404 are provided, and the optimum filter is selected over time and used.

Figure 18:
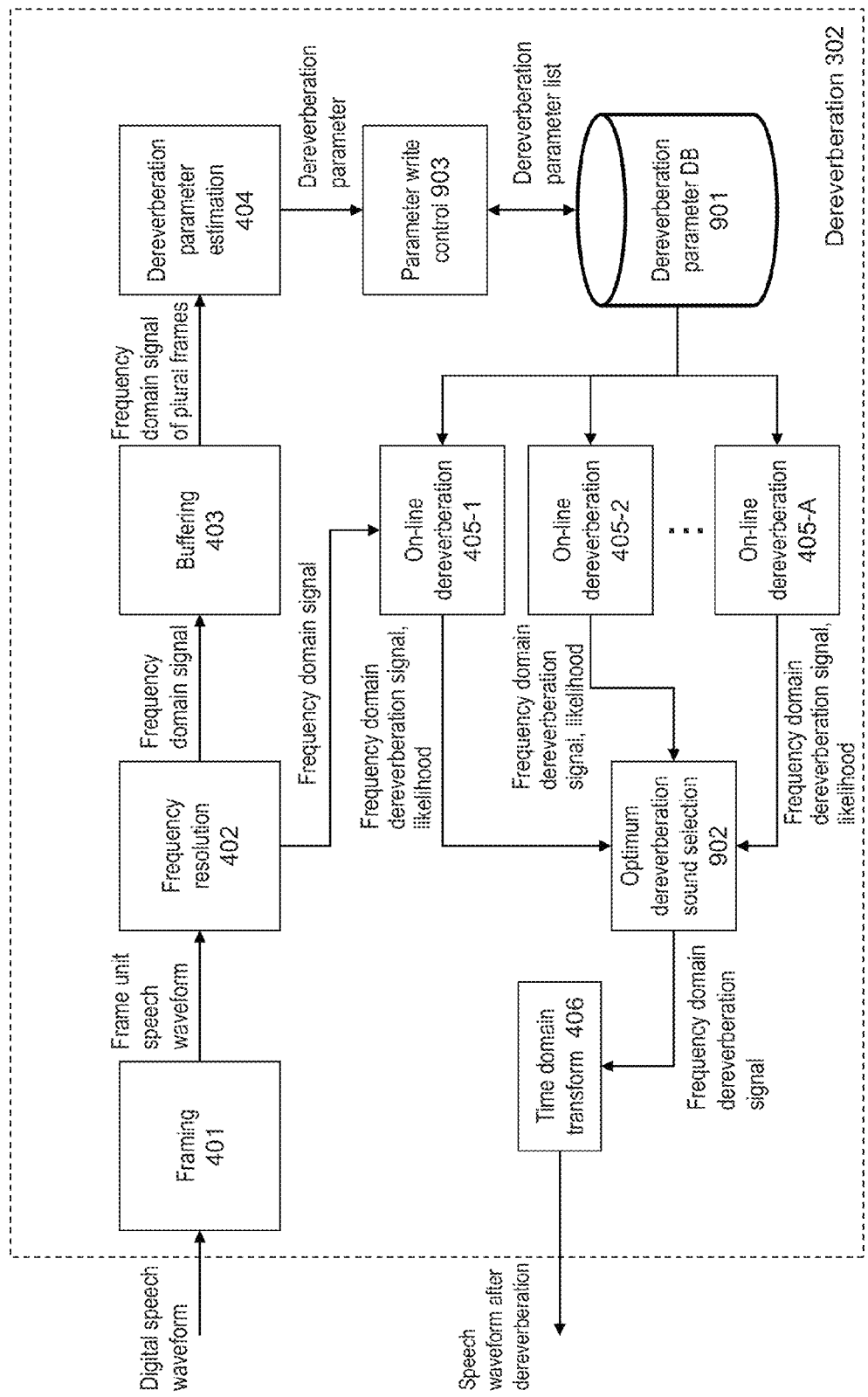
FIG. 18 is a diagram illustrating the configuration of a dereverberation process according to a second embodiment of the present invention.

FIG. 18 is a diagram illustrating the configuration of the dereverberation (process) 302 according to the second embodiment of the present invention. The present configuration of the dereverberation 302 is identical to the configuration that has been already described with reference to FIG. 8 in the configuration and process from the framing (process) 401 to the dereverberation parameter estimation (process) 404 and in the time domain transform (process) 406.

In FIG. 18, a parameter write control (process) 903 is a process of switching whether the dereverberation parameter output from the dereverberation parameter estimation 404 should be registered as a new dereverberation parameter. A dereverberation parameter DB 901 stores a predetermined number of dereverberation parameters in a DB.

The process executed by the parameter write control 903 may be configured to discard a dereverberation parameter with the oldest stored time among the dereverberation parameters stored in the dereverberation parameter DB 901 and to store a new dereverberation parameter instead, or may be configured to discard a dereverberation parameter with the minimum value of likelihood (which is herein synonymous with error) at the time of the dereverberation and to store a new dereverberation parameter instead. The configuration for discarding the dereverberation parameter may be such that the dereverberation parameters stored at the same timing are discarded on a frequency by frequency basis.

When the number of the dereverberation parameters stored in the dereverberation parameter DB 901 is A, each of on-line dereverberations (processes) 405-1 to 405-A execute a reverberation component removing process on each dereverberation parameter by an on-line process.

An optimum dereverberation sound selection (process) 902 selects one dereverberation sound from among the dereverberation sounds removed by each dereverberation parameter. For example, there may be adopted a configuration such that the component with the minimum sound volume among the respective dereverberation sounds is selected, or a configuration such that a dereverberation sound that maximizes the likelihood value is selected. For the computation of the sound volume component or the likelihood value, a value averaged in the frequency direction may be used.

The selected dereverberation sound is sent to the time domain transform (process) 406 and transformed into a time domain signal which is output. For example, dereverberation can be performed using a first parameter for the speech signal of a low frequency domain and a second parameter for the speech signal of a high frequency domain. In this way, the optimum filter can be determined on a frequency by frequency basis, so that an accurate dereverberation process can be executed even in a situation where a plurality of persons speak simultaneously. Further, in the second embodiment, the dereverberation parameters that have been determined in the past are accumulated so that the optimum parameter that has been determined in the past can be used even when the speakers are switched. Thus, the dereverberation process can be rapidly executed.

(3) Third Embodiment

A third embodiment relates to a configuration such that dereverberation and an echo canceller are executed within the same framework, enabling an increase in both dereverberation and echo canceller performance. Dereverberation and the echo canceller erasure can be operated separately, which may provide a simple configuration (see FIG. 6). However, because the shape of the filter for the echo canceller is varied constantly, a speech that could not be erased by the echo canceller may adversely affect the dereverberation. Thus, instead of optimizing the dereverberation and the echo canceller separately, the two may be simultaneously optimized (by considering their influence on each other) whereby the overall performance of the system can be further increased. In order to realize this, the configuration of the third embodiment is provided.

Figure 19:
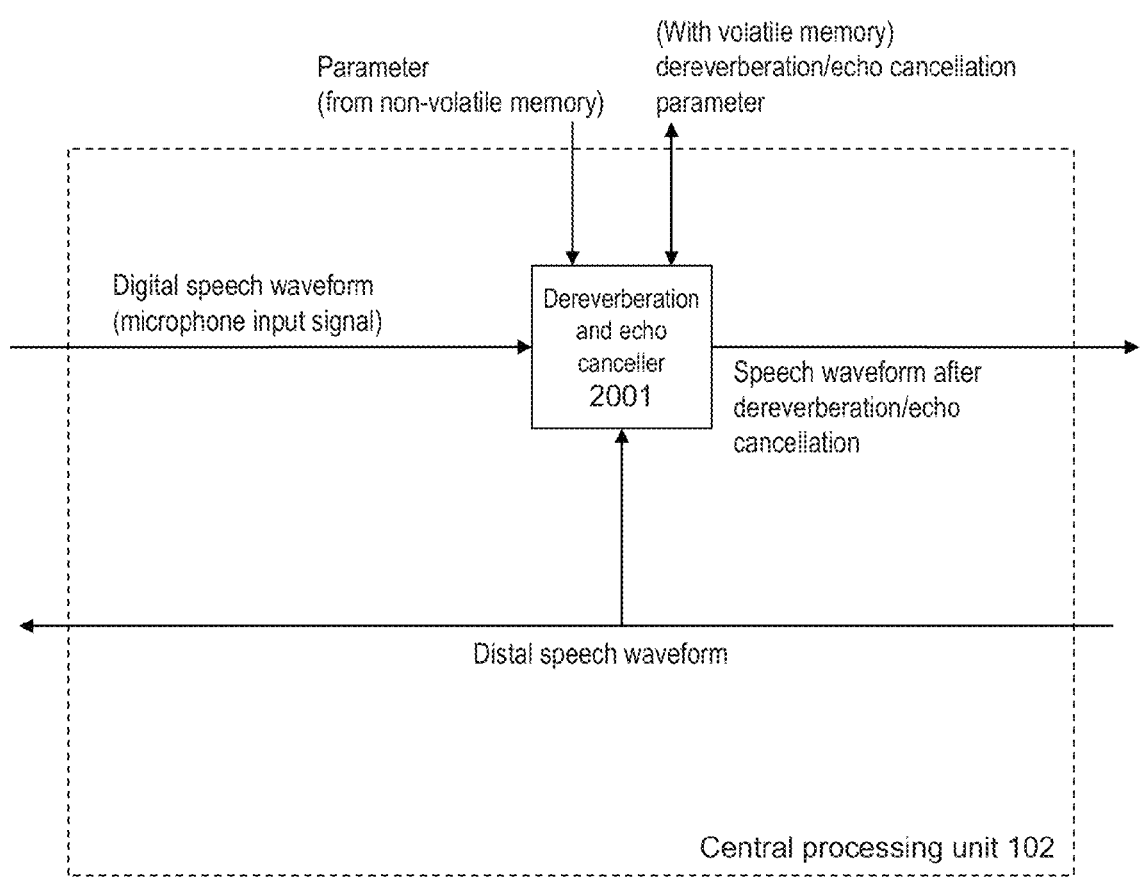
FIG. 19 is a diagram illustrating a configuration capable of increasing the performance of both dereverberation and an echo canceller.

FIG. 19 is a schematic diagram of the internal configuration of a central processing unit for executing a process according to the third embodiment.

In the program executed within the central processing unit 102, a dereverberation and echo canceller 2001 receives a digital speech waveform (microphone input signal) and a distal digital speech waveform (reference signal), executes a dereverberation process and an echo cancel process simultaneously on the signals, and then outputs a speech waveform after dereverberation and echo cancellation.

<Configuration of Dereverberation and Echo Canceller>

Figure 20:
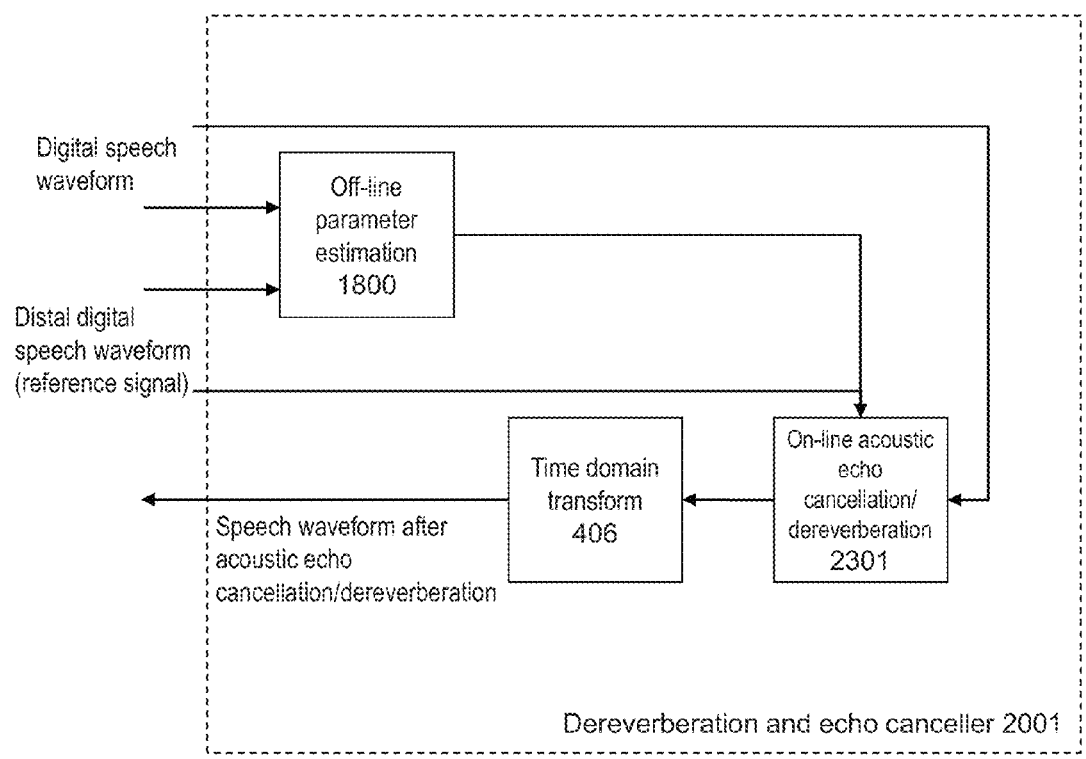
FIG. 20 is a diagram illustrating a concrete configuration of dereverberation and echo canceller 2001.

FIG. 20 is a diagram illustrating the concrete configuration of the dereverberation and echo canceller 2001. An off-line parameter estimation (process) 1800 receives the digital speech waveform (microphone input signal) and the distal digital speech waveform (reference signal), and estimates a parameter for the dereverberation and acoustic echo canceller. The off-line parameter estimation 1800 executes the estimation process each time a plurality of frames (T frames) of the time domain signal are obtained. The detailed configuration and process of the off-line parameter estimation (process) 1800 will be described later with reference to FIG. 21.

An on-line acoustic echo cancellation/dereverberation (process) 2301, using the parameter estimated by the off-line parameter estimation 1800, performs dereverberation and acoustic echo component removal on the time frequency domain signal of each frame. The detailed configuration and process of the on-line acoustic echo cancellation/dereverberation (process) 2301 will be described later with reference to FIG. 24.

The time domain transform 406 transforms the time frequency domain signal from which the reverberation component and the acoustic echo component have been removed into a time domain signal and outputs the same.

<Details of Off-Line Parameter Estimation Process>

Figure 21:
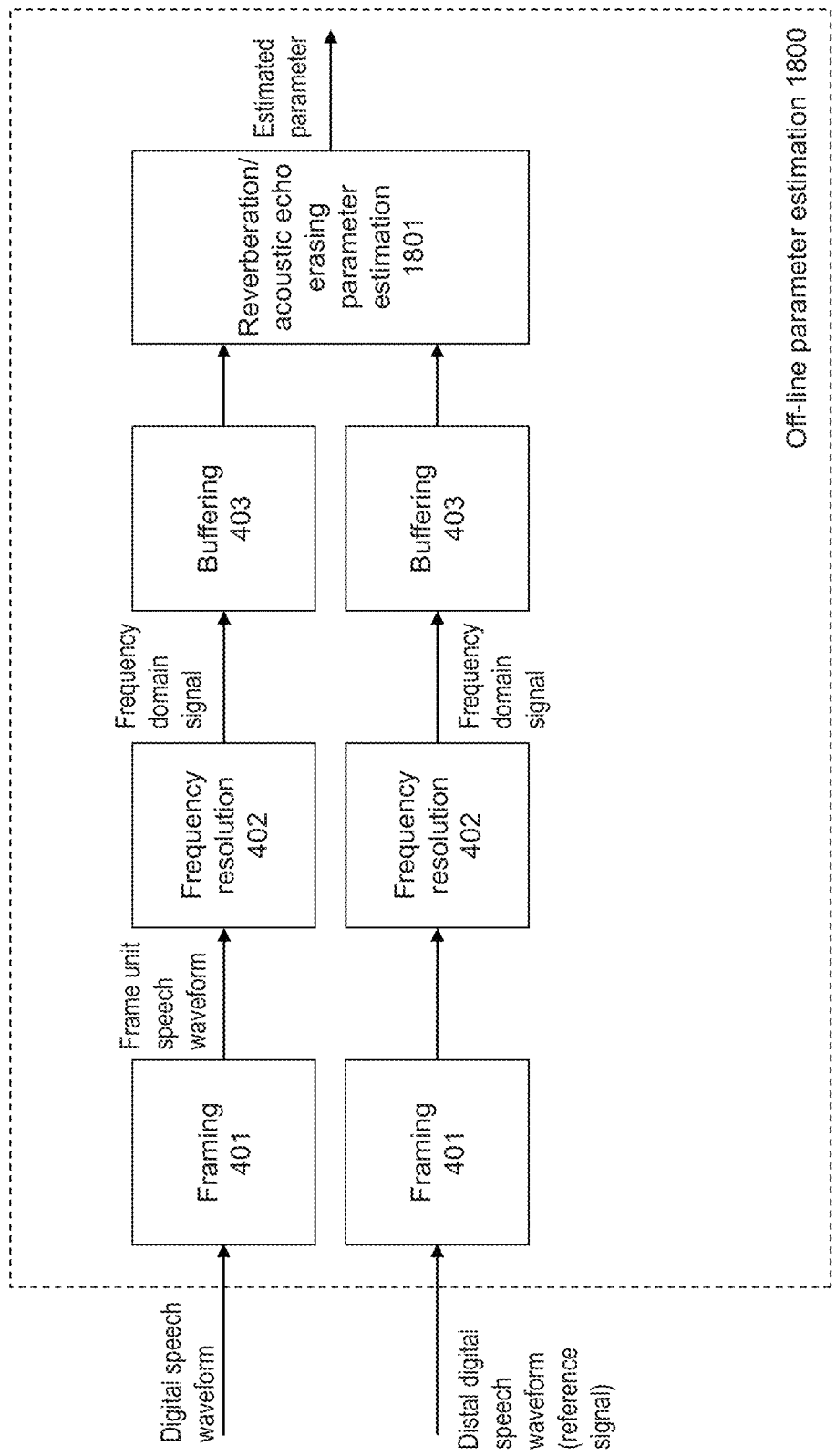
FIG. 21 is a detailed block diagram of off-line parameter estimation 1800.

FIG. 21 is a diagram illustrating the concrete block configuration of the off-line parameter estimation (process) 1800.

The digital speech waveform of the digital signal converted from the speech waveform obtained by the microphone array 105, and the distal digital speech waveform (reference signal) are subjected to the framing (process) 401 and the frequency resolution (process) 402 and then transformed into time frequency domain signals.

When the time domain signal of the reference signal of the b-th element of the speaker elements constituting the speaker array 107 is denoted as $X_{ref, b(f, \tau)}$, $X_{m(f, \tau)}$ and $X_{ref, b(f, \tau)}$ are each accumulated in a buffer in the buffering 403 for a plurality of frames (T frames), where $X_{ref, b(f, \tau)}=[X_{ref, 1(f, \tau)}, \ldots, X_{ref, B(f, \tau)}]$, and B is the number of the speaker elements.

Each time the T frames of data is accumulated by the buffering (process) 403, a reverberation/acoustic echo erasing parameter estimation (process) 1801 is executed, and a reverberation/acoustic echo erasing parameter is output. The detailed configuration and process of the reverberation/acoustic echo erasing parameter estimation (process) 1801 will be described with reference to FIG. 22.

<Details of Reverberation/Acoustic Echo Erasing Parameter Estimation Process>

Figure 22:
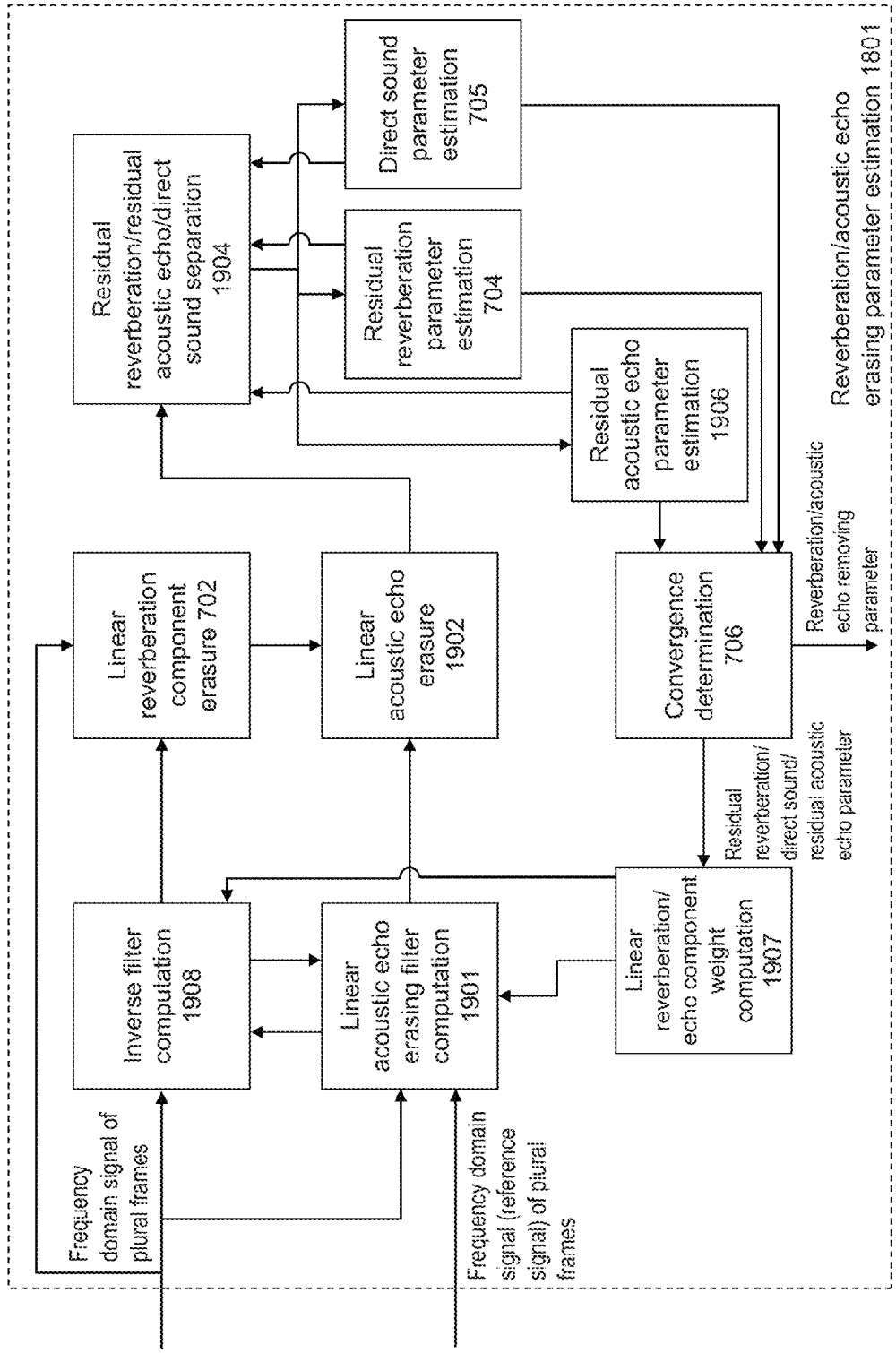
FIG. 22 is a detailed block diagram (corresponding to a flow chart) of reverberation/acoustic echo erasing parameter estimation 1801.

FIG. 22 is a diagram illustrating the concrete block configuration of the reverberation/acoustic echo erasing parameter estimation (process) 1801. The linear reverberation component erasure 702, the residual reverberation parameter estimation 704, the direct sound parameter estimation 705, and the convergence determination 706 involve the configurations and processes as described above, and therefore their detailed description will be omitted.

(i) Inverse Filter Computation Process

An inverse filter computation (process) 1908 determines a reverberation (non-fluctuating component) removing inverse filter by the above-described method (first embodiment). When computing the inverse filter, instead of the microphone input signal, a signal from which the linear acoustic echo has been erased by using the result of a linear acoustic echo erasing filter computation (process) 1901 may be used. In this case, the inverse filter computation 1908 includes the function of a linear acoustic echo erasure (process) 1902. Namely, the inverse filter computation 1908, using the echo erasing filter computed by the linear acoustic echo erasing filter computation 1901, erases the acoustic echo contained in the input signal (the frequency-domain signals of a plurality of frames), and then computes the inverse filter for dereverberation.

(ii) Linear Acoustic Echo Erasing Filter Computing Process

The linear acoustic echo erasing filter computation (process) 1901 determines the filter for acoustic echo erasure according to expression (22).

[Expression 22]

$$J_f = ivec(J_{p,f}^{-1} J_{q,f}) \quad (22)$$

At this time, the linear acoustic echo erasing filter computation (process) 1901 may determine the acoustic echo erasing filter using the signal from which the reverberation component has been removed using the inverse filter determined by the above-described inverse filter computation 1908, instead of the microphone input signal. In this case, the linear acoustic echo erasing filter computation (process) 1901 includes the function of the linear reverberation component erasure (process) 702. Namely, the linear acoustic echo erasing filter computation (process) 1901 computes the linear acoustic echo erasing filter after removing reverberation using the dereverberation inverse filter computed by the inverse filter computation 1908.

In expression (22), $J_{p,f}$, $J_{u,f,\tau(i)}$, and $J_{q,f}$ are respectively defined by expressions (23), (24), and (25).

[Expression 23]

$$J_{p,f} = \left(\sum_{i=1}^{T} (J_{u,f,\tau(i)} J_{u,f,\tau(i)}^H)' \otimes R_{x,f,\tau(i)}^{-1}\right) \quad (23)$$

[Expression 24]

$$J_{u,f,\tau(i)} = \left[x_{ref,f,\tau(i)}^H \cdots x_{ref,f,\tau(i)-L_2}^H\right]^H \quad (24)$$

[Expression 25]

$$J_{q,f} = vec\left(\sum_{i=1}^{T} R_{x,f,\tau(i)}^{-1} x_{f,\tau(i)} J_{u,f,\tau(i)}^H\right) \quad (25)$$

The acoustic echo erasing filter is divided into filters for each tap according to expression (26).

[Expression 26]

$$J_f[W_{ref,f} \cdots W_{ref,f,L_2}] \quad (26)$$

(iii) Linear Acoustic Echo Erasure Process

The linear acoustic echo erasure (process) 1902 acquires a signal $g_{2, f, \tau(i)}$ from which the acoustic echo component is erased using the acoustic echo erasing filter computed by the linear acoustic echo erasing filter computation 1901, according to expression (27).

[Expression 27]

$$g_{2,f,\tau(i)} = g_{f,\tau(i)} - \sum_{l=0}^{L_2} W_{ref,f,l} x_{ref,f,\tau(i)-l} \quad (27)$$

(iv) Residual Reverberation/Residual Acoustic Echo/Direct Sound Separation Process A residual reverberation/residual acoustic echo/direct sound separation (process) 1904, for the residual reverberation and the direct sound, uses the same determination method as that of the residual reverberation/direct sound separation 703 (first embodiment). With regard to the residual acoustic echo, a residual acoustic echo estimated value $y_{ref,l,b,f,\tau(i)}$ is computed according to expression (29) by superimposing the residual acoustic echo extraction filter $W_{ref,l,b,f,\tau(i)}$ determined by expression (28) on $g_{2,f,\tau(i)}$.

[Expression 28]

$$W_{ref,l,b,f,\tau(i)} = R_{ref,l,b,f,\tau(i)} R_{x,f,\tau(i)}^{-1} \quad (28)$$

[Expression 29]

$$y_{ref,l,b,f,\tau(i)} = W_{ref,l,b,f,\tau(i)} g_{2,f,\tau(i)} \quad (29)$$

where $R_{ref,l,b,f,\tau(i)}$ may be determined according to expression (30).

[Expression 30]

$$R_{ref,l,b,f,\tau(i)} = |x_{ref,f,\tau(i)-l}(b)|^2 C_{ref,l,b,f} \quad (30)$$

In expression (30), $C_{ref,l,b,f}$ is a parameter updated by a repetitive computation, with the initial value being set to a random positive definite Hermitian matrix.

(v) Residual Acoustic Echo Parameter Estimation Process

A residual acoustic echo parameter estimation (process) 1906 updates $C_{ref,l,b,f}$ by the same process as that of the residual reverberation parameter estimation (process) 704 (FIG. 11: first embodiment). The details are as described above and therefore the description of the details will be omitted.

(vi) Linear Reverberation/Echo Component Weight Computation Process

A linear reverberation/echo component weight computation (process) 1907 computes $R_{x,f,\tau(i)}$ according to expression (31).

[Expression 31]

$$R_{x,f,\tau(i)} = \sum_{n=1}^{N} v_{s(n),f,\tau(i)} C_{s(n),f} + \sum_{m=1}^{M} \sum_{l=D}^{L_1} |x_{f,\tau(i)-l}(m)|^2 C_{rev,l,m,f} + \sum_{b=1}^{B} \sum_{l=0}^{L_2} |x_{ref,f,\tau(i)-l}(b)|^2 C_{rev,l,b,f} \quad (31)$$

Figure 23:
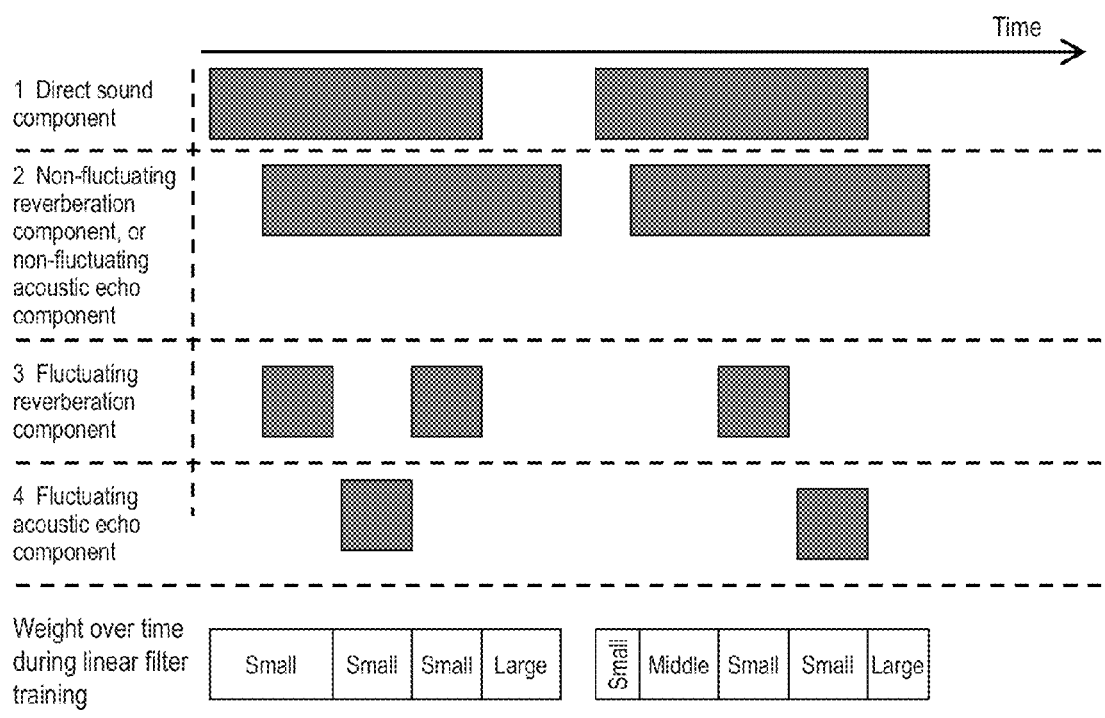
FIG. 23 is a diagram for describing the determination of a weight coefficient (influence of $R_{x,f,\tau(i)}$) in a configuration for simultaneous execution of dereverberation and echo canceller.

Then, as shown in FIG. 23, when not only the fluctuating reverberation component that influences $R_{x,f,\tau(i)}$ but also the fluctuating acoustic echo component is large, a linear filter can be determined with high accuracy so that the weights for the components are decreased.

<On-Line Acoustic Echo Cancellation/Dereverberation Process>

Figure 24:
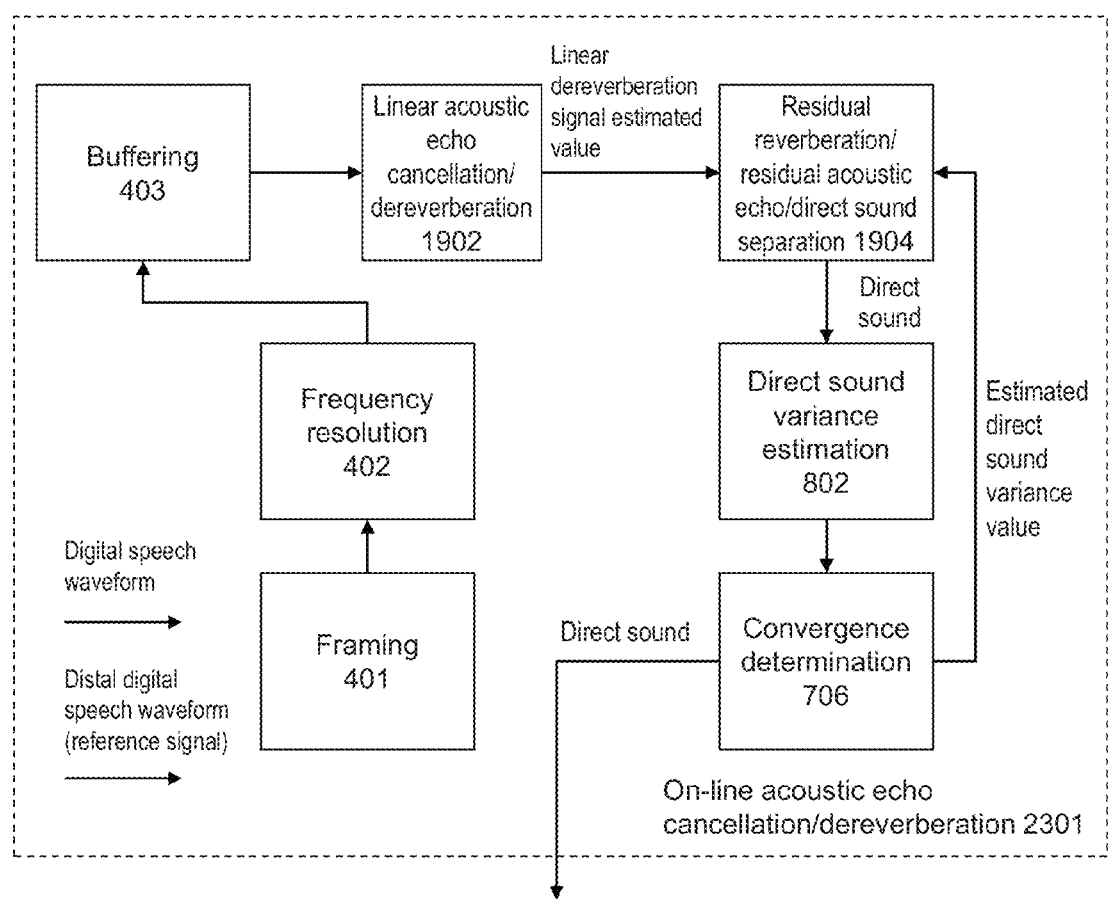
FIG. 24 is a diagram illustrating a detailed configuration (corresponding to a flow chart) of on-line acoustic echo cancellation/dereverberation 2301.

FIG. 24 is a diagram illustrating the concrete configuration of an on-line (real-time) acoustic echo cancellation/dereverberation (process) 2301.

The digital speech waveform (microphone input speech signal) and the distal digital speech waveform (reference signal) are subjected to the framing (process) 401 and the frequency resolution (process) 402, and are further buffered by the buffering (process) 403.

The buffered speech waveforms are sent to the linear acoustic echo cancellation/dereverberation (process) 1902.

The linear acoustic echo cancellation/dereverberation (process) 1902 removes the non-fluctuating reverberation and the acoustic echo component from the data of each frame of the received speech waveform.

Thereafter, the residual reverberation/residual acoustic echo/direct sound separation (process) 1904 extracts only the direct sound.

The direct sound variance estimation (process) 802 receives the extracted direct sound from the residual reverberation/residual acoustic echo/direct sound separation (process) 1904, and computes $v_{s(n),f,\tau}$. The details of the process are as described with reference to the first embodiment and their description will be omitted.

Thereafter, the convergence determination (process) 706 determines whether the variance estimation has converged and, if converged, outputs the estimated direct sound component. Otherwise, the convergence determination 706 returns the estimated direct sound variance value to the residual reverberation/residual acoustic echo/direct sound separation 1904, and the direct sound estimation process is executed again. The details of the process are also as described with reference to the first embodiment.

(4) Fourth Embodiment

A fourth embodiment relates to a dispersed configuration in which, during dereverberation, a dereverberation parameter of which the amount of computation is particularly large is executed by the conference information computation server 201, and other real-time dereverberation processes are executed by the hub-based conferencing system 100.

Figure 25:
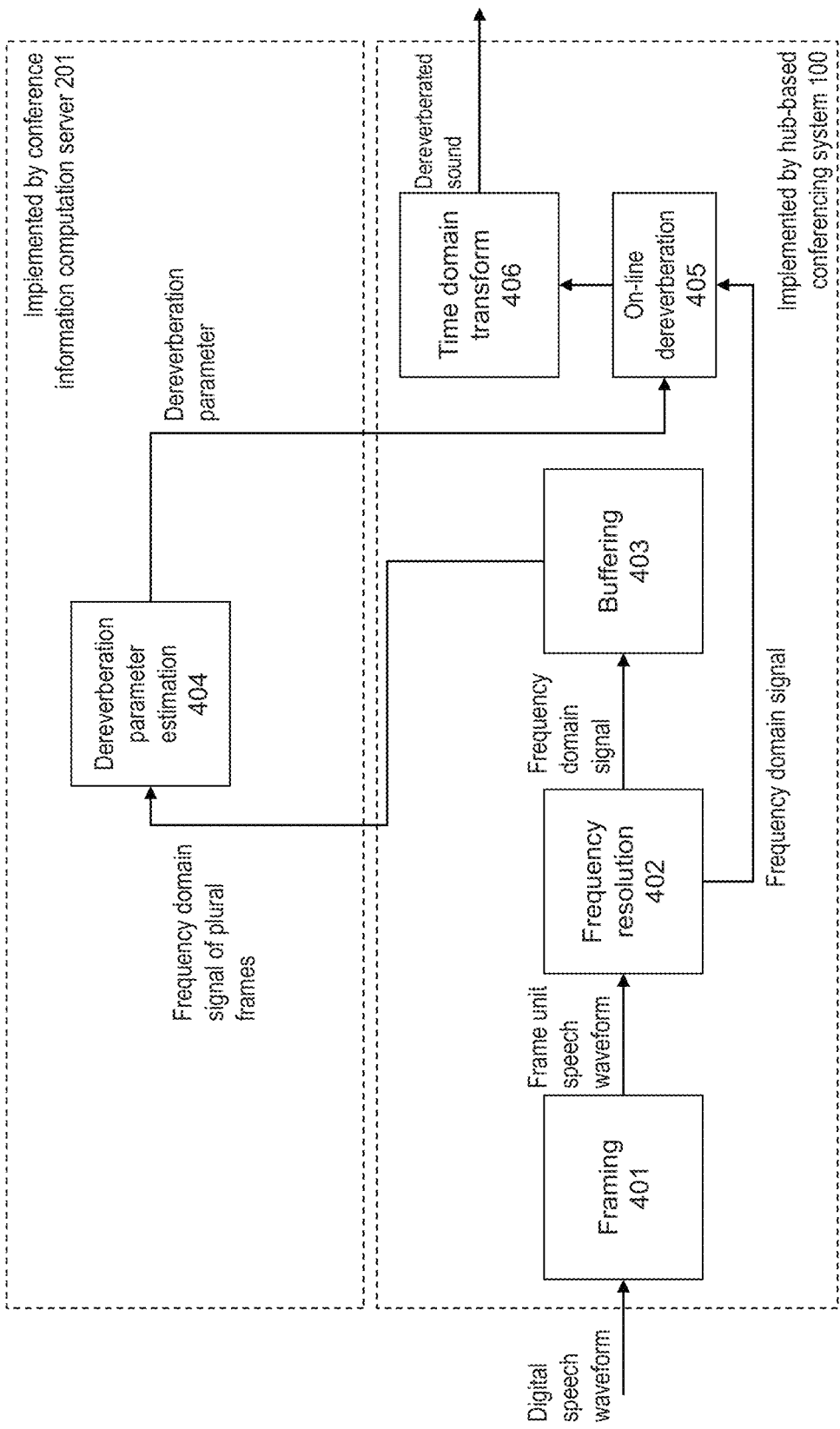
FIG. 25 is a diagram illustrating a block configuration of dereverberation by dispersed configuration.

FIG. 25 is a diagram illustrating the overall schematic system configuration according to the fourth embodiment. In FIG. 25, the framing (process) 401, the frequency resolution (process) 402, and the buffering (process) 403 are executed by the hub-based conferencing system 100. After T frames of time frequency domain signals are accumulated, the hub-based conferencing system 100 transmits the time frequency domain signals to the conference information computation server 201.

The conference information computation server 201 receives the T frames of time frequency domain signals from the hub-based conferencing system 100, and executes the dereverberation parameter estimation 404 on the signals. Then, the conference information computation server 201 transmits the estimated dereverberation parameter from the server to the hub-based conferencing system 100.

The hub-based conferencing system 100, each time it obtains the time-frequency domain signal of each frame, executes the on-line dereverberation 405 and the time domain transform 406, and acquires the dereverberation sound (dereverberated direct sound).

The conference information computation server 201 may include the configuration of the reverberation/acoustic echo erasing parameter estimation (process) 1801 indicated according to the third embodiment, instead of the configuration of the dereverberation parameter estimation (process) 404. In this case, the hub-based conferencing system 100 includes the configuration of the on-line acoustic echo cancellation/dereverberation (process) 2301 indicated according to the third embodiment, instead of the configuration of the on-line dereverberation (process) 405.

(5) Conclusion (i) In the dereverberation parameter estimation device according to the first embodiment of the present invention, a dereverberation parameter is stored in a memory such as a volatile memory and is successively updated in accordance with a process. The memory stores at least a parameter of a linear filter for removing a non-fluctuating reverberation component contained in a speech input signal, and a parameter of a non-linear filter for removing a fluctuating reverberation component contained in the speech input signal. A processor such as a central processing unit estimates and updates the dereverberation parameters for removing the reverberation components contained in the speech input signal and acquiring a direct sound, and stores the dereverberation parameters in the memory as the linear filter parameter and the non-linear filter parameter. More specifically, the processor (inverse filter computation 701 and linear reverberation component erasure 702) reads the linear filter parameter from the memory, and generates an estimated value of a linear dereverberation signal by removing the non-fluctuating reverberation component contained in the speech input signal using the linear filter. Then, the processor (residual reverberation/direct sound separation 703) reads the non-linear filter parameter from the memory, and generates estimated values of the fluctuating reverberation component and the direct sound component contained in the estimated value of the linear dereverberation signal using the non-linear filter. Thereafter, the processor (residual reverberation parameter estimation 704 and direct sound parameter estimation 705) executes a main axis operation (see FIGS. 15 and 16) based on the estimated values of the fluctuating reverberation component and the direct sound, and updates parameters of the variation reverberation component and the direct sound component constituting the non-linear filter parameter. The processor (linear reverberation component weight computation 707 and inverse filter computation 701) then successively updates the linear filter parameter based on the updated parameters of the fluctuating reverberation component and the direct sound component. Namely, the parameter of the linear filter for removing the non-fluctuating reverberation component is fixed to a certain value, the parameter of the non-linear filter for removing the fluctuating reverberation component is estimated, and the linear filter parameter is again updated in view of the obtained estimated value, the parameter estimation process being repeated until the estimation parameter converges. In this way, the parameters of the linear and non-linear filters for accurate dereverberation (dereverberation parameters) can be estimated. By executing the dereverberation process using the parameters, the reverberation component can be accurately removed without distorting the direct sound component of the speech input signal from the microphone.

The processor (linear reverberation component weight computation 707) also determines, using the updated parameters of the fluctuating reverberation component and the direct sound component, a weight coefficient for the linear filter (see FIG. 3) by reflecting a time band in which the sum of the variation reverberation component and the direct sound component is large in the speech input signal, and updates the linear filter parameter. Thus, by decreasing the weight of the filter coefficient in the time band having the possibility of transfer function fluctuation in the linear filter, a signal can be extracted by increasing the ratio of the time band having a large presence of the non-fluctuating reverberation component, whereby the influence causing a decrease in estimation accuracy of the transfer function can be reduced.

According to an embodiment of the present invention, speech signals from a plurality of microphones are contemplated as the speech input signal. In this case, the processor (residual reverberation/direct sound separation 703) generates an estimated value of the direct sound component and an estimated value of the fluctuating reverberation component contained in the speech signal from each of the plurality of microphones. Then, the processor (residual reverberation parameter estimation 704 and direct sound parameter estimation 705) extracts a secondary statistical amount of the estimated values of the direct sound component and the fluctuating reverberation component from each microphone, and acquires from the secondary statistical amount information indicating the dispersion of the power of each of the direct sound component and the fluctuating reverberation component of the speech signal of the plurality of microphones, as the fluctuating reverberation component and direct sound component parameters. In this way, when the distance between the sound source (speaker, or a sound reflecting surface of a reflecting body such as a wall or a person (where the sound emitted from the sound source is reflected)) and each microphone is different, it becomes possible to estimate parameters capable of accurately removing reverberation in consideration of the dispersion of the power of speech input to each microphone.

The first embodiment further proposes a dereverberation device having the above-described dereverberation parameter estimation device. In the device (see FIGS. 8 and 17), the processor (central processing unit) acquires the dereverberation parameters from the dereverberation parameter estimation device, removes from the speech input signal the non-fluctuating reverberation component and the fluctuating reverberation component, and outputs the direct sound component. More specifically, the processor (linear reverberation component erasure 702) removes the non-fluctuating reverberation component from the speech input signal using the linear filter and estimates the linear dereverberation signal. Then, the processor (residual reverberation/direct sound separation 703) separates the fluctuating reverberation component and the direct sound component from the linear dereverberation signal using the non-linear filter. Then, the processor (direct sound variance estimation 802 and convergence determination 706) learns a power change in the direct sound component over time, and outputs a direct sound component in which the power change has converged. In this way, the reverberation can be accurately removed in real-time. Further, the execution of the direct sound variance estimation (process of updating the direct sound in accordance with the speech power that varies over time) enables the extraction of the direct sound that tracks the sound power change over time and having no distortion.

(ii) The second embodiment proposes another dereverberation device. The device (FIG. 18) includes a dereverberation parameter database storing the dereverberation parameters obtained by the dereverberation parameter estimation device. The database stores all or some of the dereverberation parameters obtained by past estimations. In the device, the processor (on-line dereverberations 450-1 to 405-A corresponding to the installed microphones) acquires a plurality of corresponding dereverberation parameters from the dereverberation parameter database, removes the non-fluctuating reverberation component and the fluctuating reverberation component from the speech input signal using each of the plurality of dereverberation parameters, generates a plurality of direct sound components, and outputs the optimum direct sound component among the plurality of direct sound components. Thus, the dereverberation process can be executed using the parameters that have been estimated, whereby the dereverberation process can be rapidly performed and the real-time process can be facilitated.

(iii) According to the third embodiment, the memory stores a parameter of a linear reverberation filter for removing the non-fluctuating reverberation component contained in the speech input signal, a parameter of a linear echo erasing filter for removing the non-fluctuating echo component contained in the speech input signal, and a parameter of a non-linear filter for removing the fluctuating reverberation component and the fluctuating echo component contained in the speech input signal. The processor (central processing unit) also estimates a reverberation/echo removal parameter for acquiring a direct sound by removing the reverberation component and the echo component contained in the speech input signal, and stores the reverberation/echo removal parameter in the memory as a linear reverberation filter parameter, a linear echo erasing filter parameter, and a non-linear filter parameter. More specifically, the processor (inverse filter computation 1908 and linear acoustic echo erasing filter computation 1901) reads from the memory the linear reverberation filter parameter and the linear echo erasing filter parameter, and generates an estimated value of the linear reverberation/echo removal signal by removing the non-fluctuating reverberation component and the non-fluctuating echo component contained in the speech input signal using the linear reverberation filter and the linear echo erasing filter. In this case, the inverse filter computation 1908 and the linear acoustic echo erasing filter computation 1901 compute the filters by utilizing each other's process result. Namely, the linear acoustic echo erasing filter computation 1901 computes the linear acoustic echo erasing filter using the signal from which the non-fluctuating reverberation component has been removed from the speech input signal. On the other hand, the inverse filter computation 1908 computes the inverse filter using the signal from which the non-fluctuating acoustic echo component has been removed from the speech input signal. Then, the processor (residual reverberation/residual acoustic echo/direct sound separation 1904), using the non-linear filter, generates estimated values of the fluctuating reverberation component, the fluctuating echo component, and the direct sound component contained in the estimated value of the linear reverberation/ echo removal signal. The processor (residual reverberation parameter estimation 704, direct sound parameter estimation 705, and residual acoustic echo parameter estimation 1906) further, based on the estimated values of the fluctuating reverberation component, the fluctuating echo component, and the direct sound, updates the parameters of the variation reverberation component, the fluctuating echo component, and the direct sound component constituting the non-linear filter parameter. Then, the processor (linear reverberation/echo component weight computation 1907, linear acoustic echo erasing filter computation 1901, and inverse filter computation 1908), based on the updated parameters of the fluctuating reverberation component, the fluctuating echo component, and the direct sound component, successively updates the parameters of the linear reverberation filter and the linear echo erasing filter. In this way, dereverberation and echo cancellation are executed within the same framework, whereby parameters capable of increasing the process accuracy of both can be estimated.

(iv) The fourth embodiment proposes a configuration (FIG. 25) in which the reverberation parameter estimation process that puts a processing load is executed in a conferencing system computer server. In this way, the processing load on the conferencing system at each hub can be decreased, whereby the real-time nature of the conferencing system can be ensured, and the cost of constructing the conferencing system can be drastically decreased.

(v) The present invention may be implemented in a program code of software for realizing the functions of the embodiments. In this case, a storage medium recorded with the program code is provided to the system or the device, and the system or device computer (such as CPU or MPU) reads the program code stored in the storage medium. In this case, the program code itself read from the storage medium realizes the functions of the embodiments, with the program code per se and the storage medium storing the code constituting the present invention. Examples of the storage medium that may be used for supplying the program code include a flexible disc, a CD-ROM, a DVD-ROM, a hard disk, an optical disk, a magneto-optical disk, a CD-R, a magnetic tape, a non-volatile memory card, and a ROM.

Based on the instructions of the program code, the operating system (OS) and the like running on the computer may perform some or all of the actual processes, and the above-described functions of the embodiments may be realized by the processes. Further, after the program code read from the storage medium is written to a memory on the computer, the CPU and the like of the computer may perform some or all of the actual processes based on the instructions of the program code so as to realize the functions of the embodiments by the processes.

Further, the program code of the software for realizing the embodiment functions may be delivered via a network and stored in a storage means of the system or device, such as a hard disk or a memory, or in a storage medium such as CD-RW or CD-R. Then, the program code stored in the storage means or the storage medium may be read and executed by the computer of the system or device (such as CPU or MPU) when in use.

Finally, it should be understood that the processes and technologies discussed herein are not essentially related to any specific device and may be implemented by any appropriate combination of components. Further, various types of general-purpose devices may be used for the teaching described herein. It may be realized that constructing a dedicated device for executing the method steps disclosed herein is beneficial. Various inventions may be formed by appropriate combinations of the plurality of configuration elements disclosed in the embodiments. For example, some of the configuration elements may be deleted from the configuration elements indicated in the embodiments. Configuration elements from different embodiments may be combined as needed. While the present invention has been described with reference to specific examples, the description is illustrative of the invention and is not to be construed as limiting the invention in any aspect. It will be apparent to those skilled in the art that there are a number of combinations of hardware, software, and firmware appropriate for implementing the present invention. For example, the above-described software may be implemented in a wide range of programs, such as assembler, C/C++, perl, Shell, PHP, and Java (registered trademarks), or by script language.

In the foregoing embodiments, the control lines or information lines indicated are those considered necessary for description, and may not necessarily represent all of the control lines or information lines of a product. All of the configurations may be mutually connected.

In addition, to those having ordinary knowledge of the particular technology field, other implementations of the present invention will be apparent upon review of the specification and the embodiments disclosed therein. Various aspects and/or components of the embodiments that have been described may be used either individually or in combination in a computerized storage system having a data managing function. The specification and the specific examples are merely typical, and the scope and spirit of the present invention are indicated by the following claims.

REFERENCE SIGNS LIST

100 . . . hub-based conferencing system
101 . . . non-volatile memory
102 . . . central processing unit 103 . . . volatile memory
104 . . . A/D converter
105 . . . microphone array
106 . . . D/A converter
107 . . . speaker array
108 . . . HUB
109 . . . camera
110 . . . display
201 . . . conference information computation server
202 . . . MCU
301 . . . echo canceller
302 . . . dereverberation
401 . . . framing
402 . . . frequency resolution
403 . . . buffering
404 . . . dereverberation parameter estimation
405 . . . on-line dereverberation
406 . . . time domain transform
701 . . . inverse filter computation
702 . . . linear reverberation component erasure
703 . . . residual reverberation/direct sound separation
704 . . . residual reverberation parameter estimation
705 . . . direct sound parameter estimation
706 . . . convergence determination
707 . . . linear reverberation component weight computation
801 . . . buffering
802 . . . direct sound variance estimation
901 . . . dereverberation parameter DB
902 . . . optimum dereverberation sound selection
903 . . . parameter write control
1102 . . . direct sound filter coefficient estimation
1103 . . . residual reverberation filter coefficient estimation
1104 . . . target sound variance estimation over time
1105 . . . residual reverberation variance estimation over time
1201 . . . direct sound secondary statistical amount computation
1202 . . . time-varying parameter computation
1203 . . . main axis computation
1301 . . . residual reverberation secondary statistical amount computation
1302 . . . main axis computation
1401 . . . weighted correlation matrix computation
1402 . . . weighted covariance matrix computation
1403 . . . filter computation
1800 . . . off-line parameter estimation
1801 . . . reverberation/acoustic echo erasing parameter estimation
1901 . . . linear acoustic echo erasing filter computation
1902 . . . linear acoustic echo erasure
1904 . . . residual reverberation/residual acoustic echo/direct sound separation
1906 . . . residual acoustic echo parameter estimation
1907 . . . linear reverberation/echo component weight computation
1908 . . . inverse filter computation
2001 . . . dereverberation and echo canceller
2301 . . . on-line acoustic echo cancellation/dereverberation

The invention claimed is:

1. A dereverberation parameter estimation device comprising:
a memory storing a parameter of a linear filter for removing a non-fluctuating reverberation component contained in a speech input signal, and a parameter of a non-linear filter for removing a fluctuating reverberation component contained in the speech input signal; and
a processor that estimates a dereverberation parameter for acquiring a direct sound by removing the reverberation components contained in the speech input signal, and that stores the dereverberation parameter in the memory as the parameter of the linear filter and the parameter of the non-linear filter,
wherein the processor is configured to:
read the parameter of the linear filter from the memory, and generates an estimated value of a linear dereverberation signal by removing the non-fluctuating reverberation component contained in the speech input signal using the linear filter;
read from the memory the parameter of the non-linear filter, and generates estimated values of the fluctuating reverberation component and the direct sound component contained in the estimated value of the linear dereverberation signal using the non-linear filter;
based on the estimated values of the fluctuating reverberation component and the direct sound, update the parameters of the variation reverberation component and the direct sound component constituting the parameter of the non-linear filter; and
successively update the parameter of the linear filter based on the parameters of the updated fluctuating reverberation component and direct sound component.

2. The dereverberation parameter estimation device according to claim 1, wherein the processor, using the updated parameters of the fluctuating reverberation component and the direct sound component, determines a weight coefficient for the linear filter by reflecting a time band having a large sum of the variation reverberation component and the direct sound component in the speech input signal, and updates the parameter of the linear filter.

3. The dereverberation parameter estimation device according to claim 1,
wherein the speech input signal includes speech signals from a plurality of microphones,
wherein the processor is configured to:
generate the estimated value of the direct sound component and the estimated value of the fluctuating reverberation component contained in the speech signal from each of the plurality of microphones,
extract a secondary statistical amount of the estimated values of the direct sound component and the fluctuating reverberation component from each microphone; and
use, as the parameters of the fluctuating reverberation component and the direct sound component, information from the secondary statistical amount indicating a dispersion of power of each of the direct sound component and the fluctuating reverberation component of the speech signals from the plurality of microphones.

4. The dereverberation parameter estimation device according to claim 1, wherein the processor is configured to execute a convergence determination on the updated parameters of the fluctuating reverberation component and the direct sound component,
wherein the processor is configured to output the parameters of the linear filter and the non-linear filter as the dereverberation parameter if it is determined that the parameters have converged, or continues the successive updating process of the parameter of the linear filter if it is determined that the parameters have not converged.

5. A dereverberation device for removing a reverberation component contained in a speech input signal, comprising:
the dereverberation parameter estimation device according to claim 1; and
a processor that acquires from the dereverberation parameter estimation device the dereverberation parameter, and that outputs the direct sound component by removing from the speech input signal the non-fluctuating reverberation component and the fluctuating reverberation component, wherein the processor is configured to:

estimate a linear dereverberation signal by removing the non-fluctuating reverberation component from the speech input signal using the linear filter, separate the fluctuating reverberation component and the direct sound component from the linear dereverberation signal using the non-linear filter, and learn a change in power of the direct sound component over time and outputs the direct sound component in which the change in the power has converged.

6. A dereverberation device for removing a reverberation component contained in a speech input signal, comprising:

the dereverberation parameter estimation device according to claim 1;

a dereverberation parameter database storing the dereverberation parameter obtained by the dereverberation parameter estimation device in the past; and a processor that is configured to: acquire from the dereverberation parameter database a plurality of dereverberation parameters, remove the non-fluctuating reverberation component and the fluctuating reverberation component from the speech input signal using each of the plurality of dereverberation parameters, generate a plurality of direct sound components, and output an optimum direct sound component among the plurality of direct sound components.

7. The dereverberation device according to claim 6, wherein the processor, using each of the plurality of dereverberation parameters, is configured to:

estimate a linear dereverberation signal by removing, using the linear filter, the non-fluctuating reverberation component from the speech input signal;

separate the fluctuating reverberation component and the direct sound component from the linear dereverberation signal using the non-linear filter; and learn a change in power of the direct sound component over time, and outputs the direct sound component in which the change in power has converged in accordance with the plurality of dereverberation parameters.

8. An on-line conferencing system comprising:

a plurality of hub-based conferencing systems disposed at respective hubs; and a computation server that manages the plurality of hub-based conferencing systems, wherein the computation server includes the dereverberation parameter estimation device according to claim 1, processes the speech input signal received from each hub-based conferencing system using the dereverberation parameter estimation device, computes a dereverberation parameter corresponding to each hub-based conferencing system, and transmits the computed reverberation parameter to a corresponding hub-based conferencing system, wherein each of the plurality of hub-based conferencing systems transmits the speech input signal to the computation server, receives from the computation server the dereverberation parameter corresponding to the transmitted speech input signal, separates the non-fluctuating reverberation component and the fluctuating reverberation component from the speech input signal using the received reverberation parameter, and outputs the direct sound component in real-time.

9. A reverberation/echo removal parameter estimation device comprising:

a memory storing a parameter of a linear reverberation filter for removing a non-fluctuating reverberation component contained in a speech input signal, a parameter of a linear echo erasing filter for removing a non-fluctuating echo component contained in the speech input signal, and a parameter of a non-linear filter for removing a fluctuating reverberation component and a fluctuating echo component contained in the speech input signal; and a processor that estimates a reverberation/echo removal parameter for acquiring a direct sound by removing the reverberation component and the echo component contained in the speech input signal, and that stores the reverberation/echo removal parameter in the memory as the parameter of the linear reverberation filter, the parameter of the linear echo erasing filter, and the parameter of the non-linear filter, wherein the processor is configured to:

read from the memory the parameter of the linear reverberation filter and the parameter of the linear echo erasing filter, and generates an estimated value of a linear reverberation/echo removal signal by removing the non-fluctuating reverberation component and the non-fluctuating echo component contained in the speech input signal using the linear reverberation filter and the linear echo erasing filter, read from the memory the parameter of the non-linear filter, and generates estimated values of the fluctuating reverberation component, the fluctuating echo component, and the direct sound component contained in the estimated value of the linear reverberation/echo removal signal, using the non-linear filter, update the parameters of the variation reverberation component, the fluctuating echo component, and the direct sound component constituting the parameter of the non-linear filter based on the estimated values of the fluctuating reverberation component, the fluctuating echo component, and the direct sound, and successively update the parameters of the linear reverberation filter and the linear echo erasing filter based on the updated parameters of the fluctuating reverberation component, the fluctuating echo component, and the direct sound component.

10. The reverberation/echo removal parameter estimation device according to claim 9, wherein the processor is configured to update the parameter of the linear echo erasing filter applied to the speech signal after the fluctuating reverberation component is removed, and update the parameter of the linear dereverberation filter applied to the speech signal after the fluctuating echo component is removed.

11. A reverberation/echo removal device for removing a reverberation component contained in a speech input signal, comprising:

the reverberation/echo removal parameter estimation device according to claim 9; and a processor that acquires from the reverberation/echo removal parameter estimation device the reverberation/echo removal parameter, that removes the non-fluctuating and fluctuating reverberation components and non-fluctuating and fluctuating echo components from the speech input signal, and that outputs the direct sound component, wherein the processor is configured to:

estimate a linear reverberation/echo removal signal by removing the non-fluctuating reverberation component and the non-fluctuating echo component from the speech input signal using the linear reverberation filter and the linear echo erasing filter, separate the fluctuating reverberation and echo components and the direct sound component from the linear reverberation/echo removal signal using the non-linear filter, and learn a change in power of the direct sound component over time, and outputs the direct sound component in which the change in power has converged.

12. A dereverberation parameter estimation method including, using a processor, estimating a dereverberation parameter for acquiring a direct sound by removing a reverberation component contained in a speech input signal, and outputting the dereverberation parameter as a parameter of a linear filter for removing a non-fluctuating reverberation component contained in the speech input signal, and as a parameter of a non-linear filter for removing a fluctuating reverberation component contained in the speech input signal, the method comprising the steps of:

the processor reading from the memory the parameter of the linear filter, and generating an estimated value of a linear dereverberation signal by removing the non-fluctuating reverberation component contained in the speech input signal using the linear filter;

the processor reading from the memory the parameter of the non-linear filter, and generating estimated values of the fluctuating reverberation component and the direct sound component contained in the estimated value of the linear dereverberation signal using the non-linear filter;

the processor, based on the estimated values of the fluctuating reverberation component and the direct sound, updating the parameters of the variation reverberation component and the direct sound component constituting the parameter of the non-linear filter; and the processor, based on the updated parameters of the fluctuating reverberation component and the direct sound component, successively updating the parameter of the linear filter.

* * * * *